US012568398B2

(12) United States Patent
Gurney et al.

(10) Patent No.: US 12,568,398 B2
(45) Date of Patent: Mar. 3, 2026

(54) DEVICE, SYSTEM, AND METHOD TO CONTROL NETWORK LOAD AT A BASE STATION

(71) Applicant: MOTOROLA SOLUTIONS, INC., Chicago, IL (US)

(72) Inventors: David P. Gurney, Carpentersville, IL (US); Thomas B. Bohn, McHenry, IL (US); David G. Wiatrowski, Woodstock, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 293 days.

(21) Appl. No.: 18/237,237

(22) Filed: Aug. 23, 2023

(65) Prior Publication Data

US 2025/0071619 A1 Feb. 27, 2025

(51) Int. Cl.
*H04W 28/086* (2023.01)
*H04W 28/02* (2009.01)
*H04W 28/08* (2023.01)

(52) U.S. Cl.
CPC ... *H04W 28/0861* (2023.05); *H04W 28/0284* (2013.01); *H04W 28/0942* (2020.05)

(58) Field of Classification Search
CPC ......... H04W 28/0861; H04W 28/0942; H04W 28/0284
See application file for complete search history.

(56) References Cited

U.S. PATENT DOCUMENTS

| | | | |
|---|---|---|---|
| 9,204,334 B2 | 12/2015 | Wang et al. | |
| 2010/0097470 A1 | 4/2010 | Yoshida et al. | |
| 2012/0133774 A1* | 5/2012 | Sarhan | G08B 13/19645 |
| | | | 348/E7.085 |
| 2015/0015717 A1* | 1/2015 | Dong | H04N 7/181 |
| | | | 348/159 |
| 2016/0050396 A1* | 2/2016 | Gali | H04N 7/181 |
| | | | 348/159 |

(Continued)

OTHER PUBLICATIONS

Understanding LTE's Physical Resource Block (PRB), published blog, Tuesday, Feb. 21, 2023, downloaded Aug. 6, 2023, https://www.ttgint.com/understanding-Ites-physical-resource-block-prb/.

(Continued)

*Primary Examiner* — Minh Chau Nguyen
(74) *Attorney, Agent, or Firm* — PERRY + CURRIER INC. (FOR MSI)

(57) ABSTRACT

A device, system and method to control network load at a base station is provided. A computing device determines a network loading level on a given sector of a base station, the base station in communication with wireless cameras categorized according to rank. When the network loading level exceeds a first threshold, the computing device adjusts a respective scene classification threshold of a lowest rank group of the cameras to a value that decreases a likelihood of scenes of the lowest rank group of the cameras being classified at a higher scene interest level. The scenes classified according to the higher level are streamed by the cameras at a quality higher than other scenes classified to a lower scene interest level, thereby controlling the cameras of the lowest rank, that generate respective scenes according to the lower level, to lower their respective network loading on the given sector.

24 Claims, 13 Drawing Sheets

(56) References Cited

U.S. PATENT DOCUMENTS

2022/0295349 A1 * 9/2022 Han ........................ H04L 47/78
2023/0007056 A1    1/2023 Cox et al.
2024/0406350 A1 * 12/2024 Aoyagi ................ G08B 25/009

OTHER PUBLICATIONS

PCT/US2024/040791, Device, System, and Method to Control Network Load at a Base Station, Aug. 2, 2024.

* cited by examiner

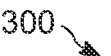

300

302 — Determining, Via A Computing Device, A Network Loading Level On A Given Sector Of A Base Station, The Base Station In Communication With Wireless Cameras Categorized According To Rank 304 — Network Loading Level Exceeds A First Threshold? — No Yes Adjusting, Via The Computing Device, A Respective Scene Classification Threshold Of A Lowest Rank Group Of The Wireless Cameras To A Value That Decreases A Likelihood Of Scenes Of The Lowest Rank Group Of The Wireless Cameras Being Classified At A Higher Scene Interest Level

306

308 — Network Loading Level Below A Second Threshold?

No

Yes

310 — Adjusting The Respective Scene Classification Threshold Of A Highest Rank Group Of The Wireless Cameras To A Respective Value That Increases The Likelihood Of The Respective Scenes Of The Highest Rank Group Of The Wireless Cameras Being Classified At A Respective Higher Scene Interest Level

FIG. 3

DEVICE, SYSTEM, AND METHOD TO CONTROL NETWORK LOAD AT A BASE STATION

BACKGROUND OF THE INVENTION

Wired cameras are expensive to install, hence many jurisdictions are installing wireless cameras, for example to monitor streets, and the like, for public safety entities. However, such wireless cameras, which wirelessly connect to a communication network via sectors of a base station, may consume available network load at the sectors of the base station.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a flowchart of a method to control network load at a base station, in accordance with some examples.

Figure 1:
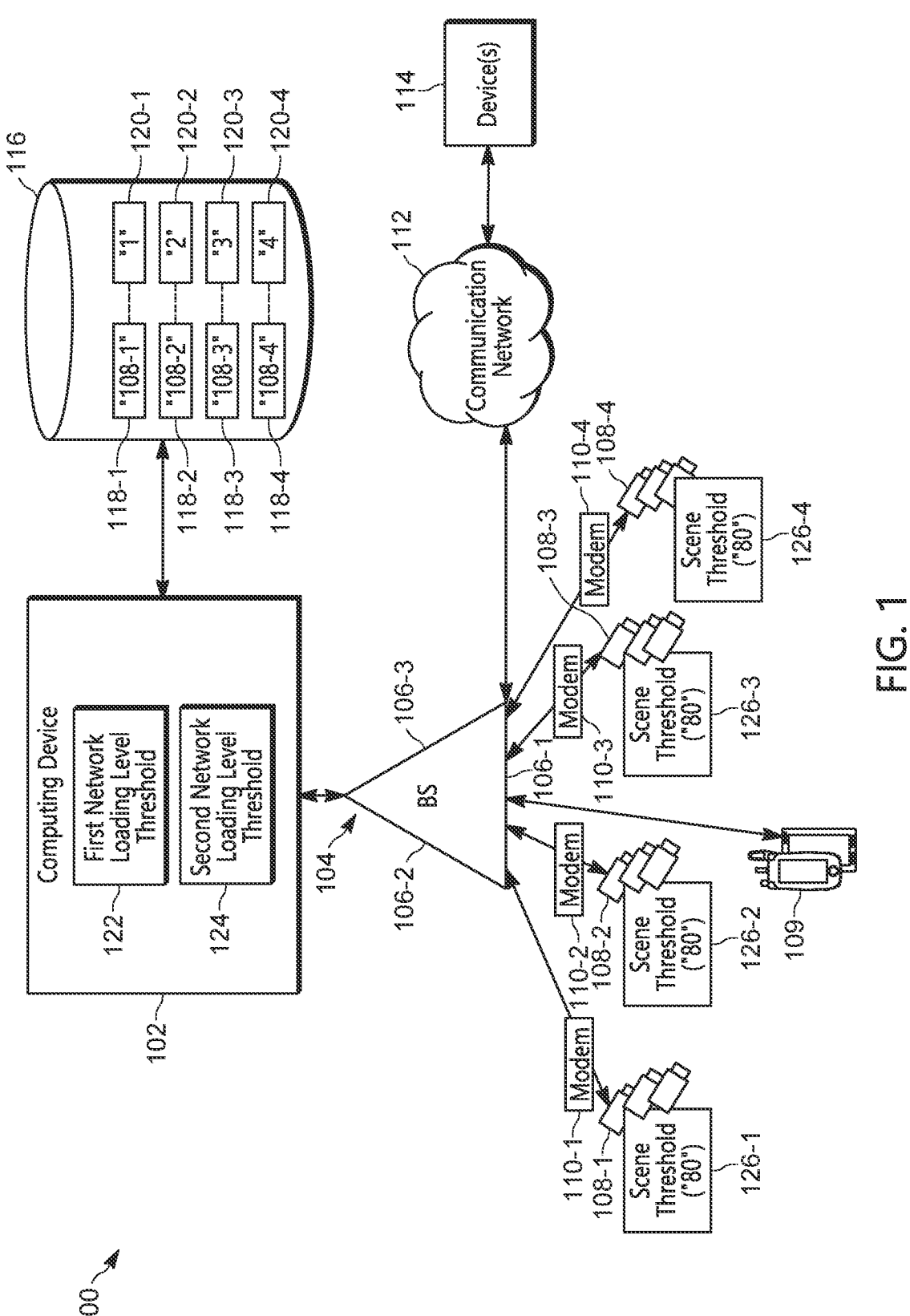
FIG. 1 is a system to control network load at a base station, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Wireless cameras are increasingly being used for public safety. Often high resolution video is being streamed by such cameras to base stations, which quickly consume network load or available resources at the base station. Such base stations may be capable of handling only a certain amount of traffic, including video being streamed by the cameras and other user traffic, such as network load consumed by mobile devices. Consumption of network load by the cameras may hence cause lags in communications or dropped data packets of the devices on the network. When such mobile devices are operated by public safety officers, or in other critical use cases, such lags and dropped data may cause serious issues. Thus, there exists a need for an improved technical method, device, and system to control network load at a base station.

Hence, provided herein is a device, system and method to control network load at a base station. In particular, a system is provided that includes a computing device in communication with a base station that includes at least one sector, and the base station is in communication with wireless cameras; communication between the base station and the wireless cameras may be via communication interfaces at the wireless cameras and/or communication between the base station and the wireless cameras may be via wireless communication devices, such as 4G LTE (Long Term Evolution) and/or 5G NR (New Radio) modems, and the like, which may handle traffic to, and from, the wireless cameras.

The wireless cameras may be categorized according to rank. For example, some wireless cameras may be in locations that are considered more strategic and/or important than others, and ranked higher than other wireless cameras in locations that are considered less strategic and/or less important. In some examples, the computing device has access to such, rankings, whereas in other examples, such rankings may be stored at the wireless cameras.

Furthermore, the wireless cameras are associated with respective scene classification thresholds. For example, scenes from video acquired by a wireless camera may be classified according to interest level. In particular, a wireless camera (or another suitable device) may analyze acquired video and assign a score to scenes in the video using any suitable algorithm, including, but not limited to, one or more machine learning algorithms and/or artificial intelligence, and the like. Scenes that have scores above a scene classification threshold may be classified as a higher interest scene level than scenes that have scores below the scene classification threshold, which may be classified at a lower scene interest level. In general, scenes classified according to the higher scene interest level may be streamed by the wireless cameras at a quality higher than other scenes classified to a lower scene interest level. Alternatively, and/or in addition, such classification may occur via the communication devices handling communications between the wireless cameras and the given sector of the base station. Alternatively, and/or in addition, such classification may occur via a cloud computing device, and the like.

Furthermore, scenes classified at a higher scene interest level may be streamed using higher quality video, and the like, than scenes classified at a lower scene interest level. For example, a higher quality video may be streamed at a higher resolution, a higher bitrate, a higher frame rate, higher key frame rate, lower compression, and the like, than a lower quality video. Accordingly, a higher quality video may contribute more to network load than a lower quality video.

In general, groups of the wireless cameras communicate via a given sector of the base station, and different groups of the wireless cameras may communicate on different sectors of the base station.

The computing device is generally configured to determine a network loading level on a given sector of the base station, and compare the network loading level to at least a first threshold, which may represent a threshold, above which, network loading on the given sector may be problematic, and may cause lags in streaming video, lags in communications, or dropped data packets of fixed devices and/or mobile devices communicating via the given sector, and the like. An example of wireless network loading in 4G and 5G communications systems is the Physical Resource Block (PRB) utilization level (e.g. on each sector and/or radio-frequency (RF) carrier of the system). A high level of network loading indicates the wireless system is nearing its maximum sustainable throughput levels (e.g., on the uplink or downlink, although remote wireless cameras typically utilizes the uplink channel).

When the network loading level exceeds the first threshold, the computing device may adjust a respective scene classification threshold of a lowest rank group of the wireless cameras to a value that decreases a likelihood of scenes of the lowest rank group of the wireless cameras being classified at a higher scene interest level. As mentioned, scene classification may be performed by one or more machine learning algorithms, artificial intelligence, and the like, although any scene classification may be performed in any suitable manner. Such adjustment of the respective scene classification threshold generally controls the wireless cameras of the lowest rank group, that generate respective scenes according to the lower scene interest level, to lower their respective network loading, thereby lowering network load on the given sector. The network load generated by a wireless camera (e.g., throughput levels and/or required throughput levels) for both the "higher scene interest level" scenes and the "lower scene interest level" scenes may be configurable by adjusting one or more video codec parameters (e.g., resolution, bitrate, frame rate, key frame rate, compression, etc.) according to a scene classification of a scene.

An aspect of the present specification provides a method comprising: determining, via a computing device, a network loading level on a given sector of a base station, the base station in communication with wireless cameras categorized according to rank; and when the network loading level exceeds a first threshold, adjusting, via the computing device, a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector.

Another aspect of the present specification provides a computing device comprising: a controller; and a computer-readable storage medium having stored thereon program instructions that, when executed by the controller, cause the computing device to perform a set of operations comprising: determining a network loading level on a given sector of a base station, the base station in communication with wireless cameras categorized according to rank; and when the network loading level exceeds a first threshold, adjusting a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, the term "engine" is understood to refer to hardware, and/or a combination of hardware and software (e.g., a combination of hardware and software includes software hosted at hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 to control network load at a base station. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like, unless otherwise indicated.

The system 100 comprises a computing device 102 in communication with a base station 104. As depicted, the base station 104 comprises three sectors 106-1, 106-2, 106-3, which are interchangeably referred to hereafter, collectively, as the sectors 106 and, generically as a sector 106. This convention will be used elsewhere in the present specification. Furthermore, while the base station 104 is depicted with three sectors 106, the base station 104 may comprise as few as one sector 106, or the base station 104 may comprise more than one sector 106 including, but not limited to, more than three sectors 106.

The base station 104 (labelled as "BS" in FIG. 1) to comprise a transceiver, for example at a fixed location, that is a communication point for one or more wireless devices, and which may wirelessly connect such one or more wireless devices to a communication network, as described herein. The base station 104 comprises one or more sectors 106 for wireless communications.

A sector 106 is understood to handle communications traffic between wireless devices and the base station 104 in a given direction and/or geographic direction. For example, the three sectors 106 are pointing in different directions which cover a 360° area around the base station 104, and a given sector 106 of the depicted base station 104 may handle communications for wireless devices over about a 120° region (or wedge) of a circular area around the base station 104.

On the depicted example, for the given sector 106-1, groups of wireless cameras 108-1, 108-2, 108-3, 108-4 (e.g. wireless cameras 108 and/or a wireless camera 108) that are from the region of the given sector 106-1 generally communicate with the base station 104 via the given sector 106-1. For simplicity, the wireless cameras 108 will be interchangeably referred to hereafter as the cameras 108 (and/or a camera 108).

A camera 108 may comprise any suitable digital camera and/or camera sensor and/or video camera and/or video sensor, and the like. Indeed, a camera 108 may be replaced by any suitable sensor which may acquire any suitable type of media and/or data which may wirelessly stream the media and/or data to a sector 106 of the base station 104. Furthermore, a camera 108 and/or sensor may be in a fixed location or mobile.

In general, the cameras 108 contribute to network loading at the given sector 106-1, for example by acquiring and wirelessly streaming video via the given sector 106-1. However, other types of wireless devices may contribute to the network loading at the given sector 106-1, for example, as depicted, one or more devices 109, which may be fixed devices or mobile devices, and which may be operated by first responders, enterprise workers, industrial workers, the general public, and/or any other suitable user. As will be described herein, streaming of video to the given sector 106-1 by the cameras 108 may result in lags in communications between the one or more devices 109 and the given sector 106-1. While the devices 109 are depicted as mobile devices, the devices 109 may comprise any suitable devices and/or communication device, which may contribute to the network loading at the given sector 106-1.

As depicted, the system 100 comprises a first group of the cameras 108-1, a second group of the cameras 108-2, a third group of the cameras 108-3, and a fourth group of the cameras 108-4. Put another way, a group of cameras 108 generally comprises one or more wireless cameras 108. As will be presently described, a grouping of the cameras 108 may be generally performed based on camera importance or priority, as described further below.

While four groups of cameras 108 are depicted, the system 100 may comprise as few as two groups of cameras 108, or more than two groups of cameras 108, including, but not limited to, more than four groups of cameras 108.

While not depicted, the system 100 may comprise other wireless cameras 108 in communication with other sectors 106 of the base station 104.

In addition, communication links (e.g. double-ended arrows) between the cameras 108 and the base station 104 (e.g. via the given sector 106-1), are understood to comprise wireless links. Furthermore, while for simplicity only one wireless link is depicted for a particular group of cameras 108, it is understood that a camera 108 may communicate with the base station 104 via a respective wireless link.

While not depicted, wireless communication between the cameras 108 and the base station 104 may occur via wireless communication devices 110-1, 110-2, 110-3, 110-4 (e.g. wireless communication devices 110 and/or a wireless communication device 110), which, as depicted, may include, but are not limited to, 4G modems, 5G modems, and the like. For example, a camera 108 may be wired to a wireless communication device 110, such that video from the camera 108 is streamed to the wireless communication device 110 via a wired communication link therebetween, and the wireless communication device 110 may stream such video to the given sector 106-1 via a wireless communication link therebetween. The wireless communication devices 110 may hence act as wireless communication intermediaries between the cameras 108 and the base station 104.

In some examples, a wireless communication device 110 may perform at least some processing (for example of video acquired by a camera 108) on behalf of a camera 108.

Furthermore, such wireless communication devices 110 may be integrated with a camera 108, and/or may be separate from a camera 108. In some examples, the system 100 may comprise a wireless communication device 110 for a camera 108 on a one-to-one basis, while in other examples, a wireless communication device 110 may handle communications and/or processing for a plurality of cameras 108. Hence, while, for simplicity, only one wireless communication device 110 is depicted per group of cameras 108, it is understood that the system 100 may comprise as many of one wireless communication device 110 per camera 108, or as few as no wireless communication devices 110, presuming that the cameras 108 are enabled for wireless communications (and/or have modems integrated therein, and the like). Furthermore, while the wireless communication devices 110 are depicted as being dedicated to respective groups of the cameras 108, when wireless communication device 110 handles communications and/or processing for a plurality of cameras 108, such cameras 108 may be in a same group or a different group; for example the wireless communication device 110-1 may handle communications and/or processing for cameras 108 in any of the first, second, third or fourth groups of the cameras 108-1, 108-2, 108-3, 108-4.

Regardless, the cameras 108 may acquire and stream video to the base station 104 via the given sector 106-1, and the base station 104 may provide such video to a communication network 112, which may be in communication with one or more devices 114 for storing such video, analyzing such video, and the like, for example for evidentiary purposes. Indeed, one or more of the devices 114 may comprise an evidentiary computing device and/or an evidentiary storage device. In some examples, a device 114 may receive video from a camera 108 and perform license plate recognition and/or facial recognition on images in the video.

In some examples, the computing device 102 may be in communication with the base station 104 via a network, including, but not limited to, the communication network 112, while in other examples the computing device 102 may be integrated with the base station 104 (e.g. as a base station controller (BSC), and the like).

It is understood that the groups of cameras 108 may be ranked according to any suitable scheme (e.g., in terms of priority or importance). For example, a higher ranked group of cameras 108 may be located in respective locations that have been heuristically determined to be of higher priority and/or importance than respective locations of a lower ranked group of cameras 108. For example, a higher ranked group of cameras 108 may be located in respective locations that are more prone to crime than respective locations of a lower ranked group of cameras 108, and/or a higher ranked group of cameras 108 may be located in respective higher traffic (e.g. vehicle and/or foot traffic) locations than respective locations of a lower ranked group of cameras 108. It is understood, however, that a given group of the cameras 108 are not necessarily located in a same location. For example, a higher ranked group of cameras 108 may be located in different respective locations that have been heuristically determined to be of higher importance.

In other examples a higher ranked group of cameras 108 may be located in respective locations that are "choke points" for a flow of vehicles and/or pedestrians and hence may be likely to acquire images of license plates, faces, and the like (e.g. such that license plate recognition, facial recognition, or any other suitable image analysis, and the like, may be performed) for a higher volume of subjects relative to a lower ranked group of cameras 108 at other locations. Put another way, a higher ranked group of cameras 108 may be located at locations, and/or mounted in positions, where license plate recognition, facial recognition, etc., may be more readily performed using images acquired by the higher ranked group of cameras 108.

In other examples, a higher ranked group of cameras 108 may have higher resolutions and/or technical capability as compared to a lower ranked group of cameras 108.

In other examples, a ranking of a group of cameras 108 may vary with time. For example, a given group of cameras 108 may have a lower resolution and/or lower technical capability than another group of cameras 108, but the given group of cameras 108 may be configured to acquire infrared (IR) images and/or have other low light image acquisition capability. In these examples, the given group of cameras 108 may have a lower rank during daylight hours and a higher rank during lowlight hours (e.g. from sunset until sunrise). Such control of a ranking of a group of cameras 108 may occur via the computing device 102, which may have access to a timetable, and the like, of sunrises and sunsets, as well as indications of which of the cameras 108 have IR and/or low light image acquisition capability, and control rankings of the cameras 108 accordingly. Indeed, such changes in rankings may occur on a camera-by-camera basis such that, at night, a camera 108 with IR and/or low light image acquisition capability may be grouped with one group of higher ranked cameras 108 (not all of which may have IR and/or low light image acquisition capability), and in the day, the camera 108 may be grouped with another group of lower ranked cameras 108.

In yet other examples, a ranking of an individual camera 108 may be controlled depending on content of an image acquired by the individual camera 108 and/or by events associated with the individual camera 108. For example, when a presence of a first responder in an emergency condition is determined in an image acquired by a given camera 108, the given camera 108 may be moved from a lower ranked group of cameras 108 to a higher ranked group of cameras 108. In these examples, the given camera 108 may perform the determination and transmit an indication of such a determination to the computing device 102 so that the computing device 102 may change the respective ranking of the given camera 108. However the determination may be performed by any suitable component of the system 100.

Furthermore, the determination may be performed in any suitable manner. For example, the determination may include determining that a first responder using a 2-way radio is in an image acquired by a given camera 108, and further determining that the first responder has actuated the radio's emergency button. However, a determination that a first responder has actuated a radio's emergency button may occur by way of any other suitable component of the system 100 (e.g., the computing device 102 and/or a device 114), receiving an indication of the actuation, and communicating the indication to the computing device 102 (e.g. when actuation of the radio's emergency button is determined by a device 114). The computing device 102 may: coordinate such images and data associated with the given camera 108; determine that a first responder is using a 2-way radio and that actuation of the radio's emergency button has occurred; and control the ranking of the given camera 108 accordingly. Hence, put another way, a ranking of a given camera 108 may change according to content of images acquired by the given camera 108, according to events detected in the system 100 that are associated with the given camera 108, and the like.

In yet a further example, a location of a first responder may be determined using any suitable location determining device (e.g. a Global Positioning System (GPS) at a mobile device of the first responder, which may report the such a location to the computing device 102 (e.g. via any other suitable component of the system 100). The computing device may match the location a field-of view and/or a location of a camera 108, and determine whether, or not, the first responder is in an image acquired by the camera 108. When the first responder is in an image acquired by the camera 108, the ranking of the camera 108 may be increased.

In yet further examples, where a given camera 108 is mobile, and hence a respective location of the given camera 108 may change, the ranking of the given camera 108 may change as location changes.

In yet further examples, where a given camera 108 is fixed or mobile, and a respective location of an incident may change over time (e.g. a riot may move), and a ranking of a given camera 108 may change as location of an incident changes based on one or more of detected content in scenes of video of the given camera 108 (e.g., which may include and then not include the incident) and/or via another component of the system 100 determining locations of the incident and adjusting the ranking of the given camera 108 based on whether or not the given camera 108 is proximal, or not proximal, to the incident (e.g. which may be based on threshold distances of the given camera 108 to the incident, such as 10 meters, 50 meters, 100 meters, amongst other possibilities).

In some examples, as depicted, the computing device 102 may have access to a memory 116 (e.g. in the form of a database, and the like), which stores identifiers 118-1, 118-2, 118-3, 118-4 (e.g. identifiers 118 and/or an identifier 118) of the groups of the cameras 108-1, 108-2, 108-3, 108-4, in association with a respective rank 120-1, 120-2, 120-3, 120-4 (e.g. ranks 120 and/or a rank 120) of the groups of the cameras 108-1, 108-2, 108-3, 108-4. The identifiers 118 are respectively labelled as "108-1", "108-2", "108-3", and "108-4" to indicate that the identifiers 118 respectively identify the first group of the cameras 108-1, the second group of the cameras 108-2 the third group of the cameras 108-3, and the fourth group of the cameras 108-4.

For example, the first group of the cameras 108-1 may be identified by any suitable identifiers 118-1, which may include, but is not limited to, respective network addresses of the first group of the cameras 108-1 and/or respective wireless communication devices 110-1, and the like. As depicted, the first group of the cameras 108-1 may have a highest rank 120-1 of "1".

Similarly, the second group of the cameras 108-2, the third group of the cameras 108-3, and the fourth group of the cameras 108-4 may be identified by any suitable respective identifiers 118-2, 118-3, 118-4 which may include, but is not limited to, respective network addresses of cameras 108, and/or respective wireless communication devices 110, and the like. As depicted, the second group of the cameras 108-2, the third group of the cameras 108-3, and the fourth group of the cameras 108-4 may have respective ranks 120-2, 120-3, 120-4 of "2", "3", and "4".

In the depicted scheme, a higher rank 120 is indicated by "1" a lower rank 120 is indicated by "4". Hence, the first group of the cameras 108-1 has a first and/or highest rank 120-1, the second group of the cameras 108-2 has a second and/or next highest rank 120-2, the third group of the cameras 108-3 has a third and/or yet next highest rank 120-3, and the fourth group of the cameras 108-4 has a fourth and/or yet next highest rank 120-4 (e.g. a lowest rank 120-4).

Conversely, the fourth group of the cameras 108-2 has a lowest rank 120-4, the third group of the cameras 108-3 has a next lowest rank 120-3, the second group of the cameras

108-2 has a yet next lowest rank 120-2, and the first group of the cameras 108-3 has a yet next lowest rank 120-1 (e.g. the highest rank 120-1).

However, any suitable ranking scheme is within the scope of the present specification.

Furthermore, the computing device 102 may adjust a rank 120 of one or more of the cameras 108 in any suitable manner, for example according to time, according to content of images acquired by a camera 108, according to events detected in the system 100 that are associated with a camera 108, and the like. In yet further examples, the computing device 102 may adjust a rank 120 of one or more of the cameras 108 based on any suitable external trigger, which may include, but is not limited to, input received from a device (e.g. such as device 109 and/or any other suitable device, such as a device 114) to adjust a rank 120 of a camera 108, and the like.

Regardless, the ranks 120 may be used to order the groups of the cameras 108 according to a respective rank 120, for example, from a highest to lowest ranking of the cameras 108 (e.g. in order, the first, second, third and fourth groups of the cameras 108-1, 108-2, 108-3, 108-4), or a lowest to highest ranking of the cameras 108 (e.g. in order, the fourth, third, second and first groups of the cameras 108-4, 108-3, 108-2, 108-1).

Alternatively, or in addition, a rank 120 of a given camera 108 may be stored at a respective memory of the camera 108 and/or of a respective wireless communication device 110.

The computing device 102 is configured to determine a network loading level on a given sector 106 of the base station 104. For example, the base station 104 is understood to comprise any suitable combination of components for handling network traffic. For example, the base station 104 is generally configured to receive network traffic from wireless devices on the given sectors 106, for example on an upload communication link, and transmit the network traffic via the communication network 11. Similarly, the base station 104 is further generally configured to receive network traffic on the communication network 112, and transmit the network traffic via the given sectors 106 to wireless devices, for example on a download communication link. Such network traffic may be supported via allocating Physical-layer Resource Blocks (PRBs) on the wireless channel (on a downlink direction or uplink direction), and the like, though such network traffic may be provided in any suitable format. Hence, while PRBs will be used hereafter as an example, it is understood that the network traffic monitoring may be in any suitable format. Monitoring PRB utilization levels generally captures a total amount of data traffic consumed by a wireless link (in the uplink or downlink directions), and as such, takes into account wireless channel characteristics (e.g., path losses, modulation and coding schemes, interference levels, etc.) for all wireless users on a sector 106.

Hence, the computing device 102 may determine a network loading level by communicating with the base station 104, and/or a network management system (NMS) which maintains statistics, and the like, of network loading at the base station 104, and/or other base stations.

The computing device 102 may distinguish between PRBs (and the like) provided on the upload communication link (e.g. from the cameras 108 and/or the devices 109), and PRBs (and the like) provided on the download communication link (e.g. to the cameras 108 and/or the devices 109). It is hence further understood that, as depicted, a communication link between the cameras 108 and the given sector 106-1 comprises a respective upload communication link and a respective download communication link. It is further understood that methods and processes as described herein are utilized to control bandwidth usage at the base station 104 (and/or other base stations), on the upload communication link. However, such methods and processes as described herein may additionally, or alternatively, by utilized to control bandwidth usage at the base station 104 (and/or other base stations), on a download communication link.

As depicted, the computing device 102 maintains at least a first network loading level threshold 122 (interchangeably referred to hereafter as the first threshold 122), which may comprise a network loading level threshold above which, network loading on a given sector 106 of the base station 104 may be problematic, and may cause lags in streaming video, dropped data packets, and lags in communications of the devices 109 communicating via the given sector 106, and the like. The first threshold 122 may be determined heuristically and provisioned at the computing device 102 accordingly. In some examples, the first threshold 122 may be provided as a percentage of a maximum sector capacity, such as 85%, 90%, 95% of a maximum sector capacity. Alternatively, or in addition, the first threshold 122 may be expressed in a number of PRBs (e.g. 85%, 90%, 95% of a maximum sector capacity expressed in PRBs), and/or any other suitable units. In a specific non-limiting example, a maximum sector capacity may comprise utilizing 100 PRBs (on a 20 MHz 4G LTE channel) and hence, a percentage of a maximum sector capacity may be determined from such a maximum sector capacity. Continuing this 20 MHz 4G LTE system example, when PRB utilization for the sector exceeds 90 PRBs, the 90% network loading level threshold is reached, and the actions described herein may occur.

As depicted, the computing device 102 maintains at least a second network loading level threshold 124 (interchangeably referred to hereafter as the second threshold 124), which is generally less than the first threshold 122. The second threshold 124 may comprise a network loading level threshold below which there may be excess network capacity, and/or network loading may be increased without immediate danger of exceeding the first threshold 122. The second threshold 124 may be determined heuristically and provisioned at the computing device 102 accordingly. In some examples, the second threshold 124 may be provided as a percentage of a maximum sector capacity, such as 30%, 40%, 50%, 60% of a maximum sector capacity. Alternatively, or in addition, the second threshold 124 may be expressed in a number of PRBs (e.g. 30%, 40%, 50%, 60% of a maximum sector capacity expressed in PRBs), and/or any other suitable units. The second threshold 124 may be optional.

Returning to the first threshold 122, for a given sector 106, and using the given sector 106-1 as an example, the computing device 102 may determine a network loading level on the given sector 106-1 and compare to the first threshold 122. When the network loading level exceeds the first threshold 122, the computing device 102 may adjust a respective scene classification threshold of a lowest rank group of the wireless cameras 108, as is next described.

For example, as depicted, the first, second, third and fourth groups of the cameras 108-1, 108-2, 108-3, 108-4 are associated with respective scene classification thresholds 126-1, 126-2, 126-3, 126-4 (e.g. scene classification thresholds 126 and/or a scene classification threshold 126), which may be used by a respective camera 108, and/or any device (e.g. such as a wireless communication device 110) classifying scenes of video acquired by the cameras 108. For example, while present example are described with respect to a respective camera 108 and/or an associated a wireless communication device 110 classifying scenes of video, a cloud computing device, and the like (e.g. such as the computing device 102, a device 114, and the like) may receive video from a camera 108 and perform such scene classification.

Hereafter, while processing of video for scene classification is described as occurring at the cameras 108, it is understood such scene classification may occur at any suitable device of the system 100, including, but not limited to a wireless communication device 110 and/or cloud computing device to which a camera 108 is connected. Hence, while the scene classification thresholds 126 are depicted at the cameras 108, the scene classification thresholds 126 may be available to any suitable device of the system 100 performing scene classification.

In particular, the cameras 108, and the like, may be implementing any suitable algorithm for classifying scenes of video acquired by the cameras 108 including, but not limited to, any suitable combination of one or more machine learning algorithms and/or artificial intelligence algorithms, and the like, trained for scene classification. Hereafter the terms machine learning algorithms and artificial intelligence are used interchangeably. Using machine learning algorithms as an example, video may be input into a machine learning algorithm trained to classify scenes in the video, and such a machine learning algorithm may generate and/or output a score for the scene and/or the video input to the machine learning algorithm. In particular, video may be input into the machine learning algorithm in portions (e.g. individual images and/or frames from the video, 1 second portions, 5 second portions, 10 second portions, amongst other possibilities), and the machine learning algorithm may generate and/or output a score associated with a scene of the portion. Indeed, as understood herein, a "scene" may comprise any suitable portion of a video.

Furthermore, the score generated by a machine learning algorithm may be related to a likelihood of scenes including given content which the machine learning algorithm is trained to identify, which may include, but is not limited to, a given person, clothing characteristics, a given vehicle, vehicle characteristics, an given object type (e.g., a weapon, gun, knife, package, suitcase, etc.), a person with or without a facemask, one or more given types of public and/or enterprise incidents and/or industrial safety incidents (e.g., smoke, a fire, overheating equipment, unexpected gases, speeding vehicles, wrong way movement detection (vehicular, pedestrian), perimeter intrusion (boundary crossing), loitering detection, a break-in/robbery, a carjacking, amongst other possibilities), and the like. However, the given content may comprise any suitable given content. Furthermore, different machine learning algorithms for different cameras 108 may be trained to identify different given content and/or different given types of incidents.

Such a score may be on a scale of 0 to 100, with 0 representing a lowest likelihood of scenes including given (e.g., interesting) content, and 100 representing a highest likelihood of scenes including the given (e.g., interesting) content.

The score may be compared to a respective scene classification threshold 126, independently for each camera 108, which, as depicted, are all "80", though the groups of the cameras 108 may be associated with a different respective threshold 126, and, indeed, in some examples, respective scene classification threshold thresholds 126 may be respective to given cameras 108, and/or different for different cameras 108 (e.g. on a one-to-one basis). Initially, the respective scene classification threshold 126 may be set to a default respective scene classification threshold 126 (e.g. such as "80"). In some examples, scenes that have a score above a threshold 126 may be processed as "interesting scenes" by any suitable components of the system 100 processing such scenes (e.g. by a camera 108, a wireless device 110, the computing device 102, a device 114), while scenes that have a score equal to or below this threshold may be treated as "uninteresting" scenes by any suitable components of the system 100 processing such scenes. For example, "interesting scenes" may be stored (e.g. until reviewed by a human, and the like) and/or classified as potential evidence by a device 114, while "uninteresting scenes" may be stored for only a given period of time and/or discarded and/or not classified as potential evidence by a device 114. Hence, in some examples, a scene of a video may be provided with a respective scene classification for appropriate processing in the system 100.

It is further understood that quality of video streamed by the cameras 108 may be changeable and/or controllable. For example, while the term "quality" may be qualitative and/or relative, controlling a quality of a video is understood to be quantifiable, at least relative to other videos. For example, a higher quality video may have a higher resolution, a higher bitrate, a higher frame rate, higher key frame rate, lower compression, and the like, than a lower quality video. Indeed, any suitable parameter of a video may be controlled to increase or decrease quality, including, but not limited to, resolution, bitrate, frame rate, compression rate, I-frame rate, P-frame rate, B-frame rate, "smart" codec settings (e.g., that apply higher resolutions or frame rates to the moving portions of scenes), forward error correction (FEC) rate, and the like, amongst other possibilities.

In particular, it is understood that a higher quality video streamed from a camera 108 to the given sector 106-1 generally increases network loading (e.g., a throughout and/or required throughput, and the like) on the given sector 106-1, relative to a lower quality video. Put another way, network loading on the given sector 106-1 may be increased or reduced by respectively raising or lowering quality of video streamed to the given sector 106-1.

It is yet further understood that quality of video streamed by a camera 108 may be adjusted by a camera 108, for example, by way of components of the camera 108 increasing or decreasing resolution, bitrate, frame rate, and the like, of such video to respectively increase or decrease quality of the video.

Furthermore, in some examples, when the score of a scene of a video streamed by a camera 108 (e.g. as determined by a machine learning algorithm, and the like) exceeds a respective scene classification threshold 126, the camera 108 may stream the video at a higher quality; conversely, when the score of a scene of a video streamed by a camera 108 is lower than a respective scene classification threshold 126, the camera 108 may stream the video at a lower quality. Hence, scenes of video having a relatively higher likelihood of including given (e.g., interesting) content may be streamed at a higher quality than scenes of video having a relatively lower likelihood of including the given (e.g., interesting) content. Such higher quality video may assist in collecting better quality evidence associated with certain given content and/or may lead to a higher quality assessment of such evidence (e.g. as higher quality video may include more details than lower quality video); similarly, lower quality video may be used for scenes that have a lower likelihood of including given content to reduce network load on the given sector 106-1.

Furthermore, when a camera 108 is streaming video at a lower quality, due to scores of scenes thereof being below a respective scene classification threshold 126, and a score of a scene of the video increases to above the respective scene classification threshold 126, the camera 108 may change the streaming of the video to a higher quality (e.g., for interesting content). Conversely, when a camera 108 is streaming video at a higher quality, due to scores of scenes thereof being above a respective scene classification threshold 126, and a score of a scene of the video decreases to below the respective scene classification threshold 126, the camera 108 may change the streaming of the video to a lower quality (e.g., for uninteresting content).

Returning to the computing device 102, the computing device 102 may determine the network loading level (e.g., PRB utilization level, amongst other possibilities) on the given sector 106-1, by communicating with components of the base station 104, and compare the network loading level with the first threshold 122.

When the network loading level exceeds the first threshold 122, the computing device 102 adjusts a respective scene classification threshold 126 of a lowest rank group of the cameras 108 to a value that decreases a likelihood of scenes of the lowest rank group of the cameras 108 being classified at a higher scene interest level.

For example, the computing device 102 may process the ranks 120 from the memory 116 to determine that the identifiers 118-4 are associated with the lowest ranked fourth group of the cameras 108-4, and transmit a command to the fourth group of the cameras 108-4 using the identifiers 118-4. The command may be transmitted on a downlink communications channel from the given sector 106-1 to the fourth group of the cameras 108-4. Furthermore, the command is understood to cause the fourth group of the cameras 108-4 to increase the respective scene classification threshold 126-4 from a current value (e.g. of "80") to a higher value (e.g. such as "85", "90", "95", amongst other possibilities), causing the cameras to be less likely to determine that a given scene contains given (e.g., interesting) content (and thus requiring lower average bitrates to transmit the less interesting video information). In some examples, the command may cause the fourth group of the cameras 108-4 to increase the respective scene classification threshold 126-4 from a current value to a higher value by a given amount (e.g. such as "4", "5", "6", and the like, amongst other possibilities) and/or by a given percentage (e.g. such as 5%, 10%, 15%, and the like, amongst other possibilities).

Hence, with the respective scene classification threshold 126-4 being increased, an algorithm, such as a machine learning algorithm, and the like, classifying scenes of video being streamed by the fourth group of the cameras 108-4 has a lowered likelihood of classifying scenes at a higher scene interest level.

Put another way, scenes of video being streamed by the fourth group of the cameras 108-4 has a greater likelihood of being classified at a lower scene interest level, and hence the cameras 108-4 of the lowest rank group have a greater likelihood of streaming such video at a lower quality, which may generally lower their respective network loading on the given sector 106-1.

It is further understood that, when the network loading level is less than the second threshold 124, the computing device 102 may adjust a respective scene classification threshold 126 of a highest rank group of the cameras 108 to a value that increases a likelihood of scenes of the highest rank group of the cameras 108 being classified at a higher scene interest level (e.g. and may hence require a higher average bitrate to transmit "interesting" scenes and/or video). For example, a respective scene classification threshold 126-1 of the highest ranked first group of the cameras 108-1 may be decreased. While such a decrease may increase network loading on the given sector 106-1, for example as the highest ranked first group of the cameras 108-1 changes from streaming lower quality video to higher quality video when scores of scenes exceed the now lowered respective scene classification threshold 126-1, when the network loading later exceeds the first threshold 122, the respective scene classification threshold 126-4 of the lowest ranked fourth group of the cameras 108-4 may be decreased.

It is further understood that the computing device 102 may control network load on all of the sectors 106 of the base station 104, for example by determining a network loading level on any given sector 106, comparing such network load to the first threshold 122 and/or the second threshold 124, and adjusting a respective scene classification threshold 126 accordingly for cameras 108 communicating on the given sector 106. Such adjustments may occur on a sector-by-sector basis.

However, in some examples, interference may occur between the sectors 106, and adjusting the first threshold 122 may occur taking such interference into account. For example, when interference between the given sector 106-1 and an adjacent sector 106 (e.g. one or more of the sector 106-2, 106-3) is above a threshold interference level, a capability of the given sector 106-1 to handle a given network load may be reduced. Hence, when interference between the given sector 106-1 and an adjacent sector 106 is above a threshold interference level, the first threshold 122 for the given sector 106-1 (e.g. and of adjacent sector 106) may be lowered (e.g. by the computing device 102) from a given value and/or initial value to a lower value (e.g. which may be 60%, 70%, 80%, amongst other possibilities of the given value and/or initial value), to account for the reduced or limited capacity of the given sector 106-1. Similarly, the second threshold 124 may also be adjusted in such interference examples, to help account for the reduced or limited capacity of the given sector 106-1.

In further examples, for an overloaded sector 106 (e.g. a sector 106 handling network load that is above threshold network load, such as 95%, 96%, 97% of a maximum network load, and the like), the computing device 102 may attempt to control one or more devices (e.g. a camera 108, a device 109, a wireless communication device 110) communicating with the overloaded sector 106 to communicate with an adjacent sector 106, and the like (e. g., which may not be overloaded) for example, by transmitting a command to such devices, from the overloaded sector 106 and/or the adjacent sector 106, and the like. Such attempts to control the one or more devices communicating with the overloaded sector 106 to communicate with an adjacent sector 106, and the like, may occur after one or more of the thresholds 124, 126 have been adjusted and overloading is still occurring at the overloaded sector 106.

It is further understood that increasing a respective scene classification threshold 126 of a group of cameras 108 decreases a likelihood of scenes in video acquired by the group of cameras 108 being classified at a higher scene interest level, as when the respective scene classification threshold 126 is increased the respective scene classification threshold 126 is less likely to be met and/or exceeded. Conversely, it is further understood that decreasing a respective scene classification threshold 126 of a group of cameras 108 increases a likelihood of scenes in video acquired by the group of cameras 108 being classified at a higher scene interest level, as when the respective scene classification threshold 126 is decreased the respective scene classification threshold 126 is more likely to be met and/or exceeded. It is understood that different schemes for scene classifications or thresholds (e.g., increasing a scene classification threshold 126 may increase the likelihood of scenes in acquired video being classified at a higher scene interest level) may be utilized without any loss of generality in different examples described herein. Put another way, any suitable scheme for adjusting a respective scene classification threshold 126 of a lowest rank group of the wireless cameras 108, to a value that decreases a likelihood of scenes of the lowest rank group of the wireless cameras 108 being classified at a higher scene interest level, is within the scope of the present specification.

Figure 2:
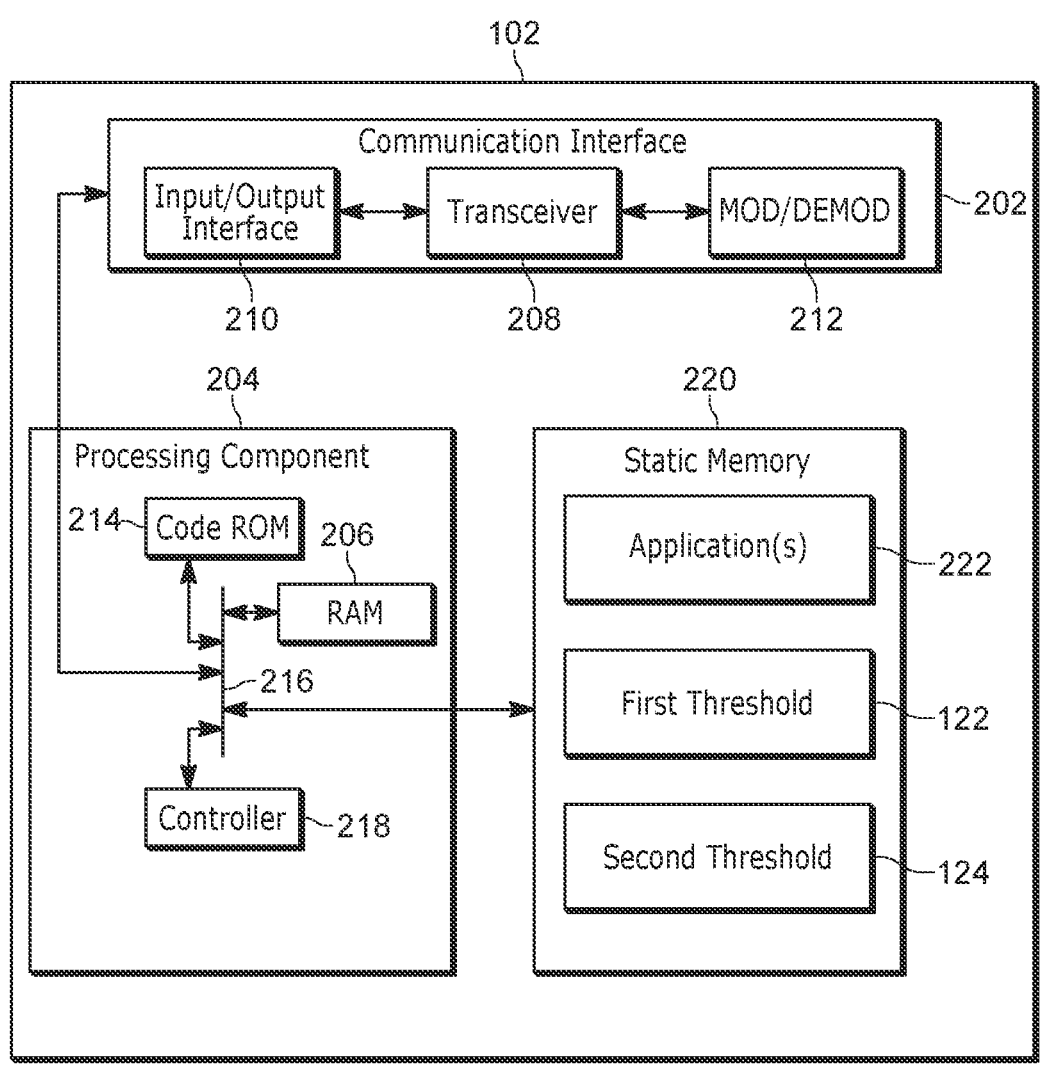
FIG. 2 is a device diagram showing a device structure of a computing device to control network load at a base station, in accordance with some examples.

Attention is next directed to FIG. 2, which depicts a schematic block diagram of an example of the computing device 102. While the computing device 102 is depicted in FIG. 2 as a single component, functionality of the computing device 102 may be distributed among a plurality of components and the like including, but not limited to, any suitable combination of one or more servers, one or more cloud computing devices, on-premises processors, and the like. As has already been mentioned, the computing device 102 may be integrated with, and/or may comprise, a base station controller of the base station 104. In examples where the computing device 102 comprises one or more cloud computing devices, a network management system, and the like, the computing device 102 may control network load at a plurality of base stations, including, but not limited to, the base station 104.

As depicted, the computing device 102 comprises: a communication interface 202, a processing unit 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration. Furthermore, a portion of the memory 220 may comprise the memory 116.

While not depicted, the computing device 102 may include, and/or be in communication with, one or more of an input component and a display screen (and/or any other suitable notification device) and the like.

As shown in FIG. 2, the computing device 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Wi-Fi network, for example operating in accordance with an IEEE 802.11 standards (e.g., 802.11a, 802.11b, 802.11g), a 3GPP (3rd Generation Partnership Project) 4G LTE (Long-Term Evolution) network, a 3GPP 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or other types of GSM (Global System for Mobile communications) and/or another similar type of wireless networks. Hence, the one or more transceivers 208 may include, but are not limited to, a cell phone transceiver, a DMR transceiver, P25 transceiver, a TETRA transceiver, a 3GPP transceiver, a 4G LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

It is understood that while DMR transceivers, P25 transceivers, and TETRA transceivers may be particular to first responders, in some examples, the system 100 may be operated by a first responder entity (e.g., such as a police department, a fire department, an emergency medical services department, and the like). In other examples, however, the system 100 may be operated by an enterprise entity, including, but not limited to, business, industrial or utility entities.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality to control network load at a base station. For example, in some examples, the computing device 102 and/or the controller 218 specifically comprises a computer executable engine configured to implement functionality to control network load at a base station.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

As depicted, the memory 220 further stores the first threshold 122 and the second threshold 124. While the first threshold 122 and the second threshold 124 are depicted as separate from the at least one application 222, one or more of the first threshold 122 and the second threshold 124 may be stored as a component and/or a module of the application 222.

Regardless, it is understood that the memory 220 stores instructions corresponding to the at least one application 222 that, when executed by the controller 218, enables the controller 218 to implement functionality to control network load at a base station, including, but not limited to, the blocks of the method set forth in FIG. 3.

The application 222 may include programmatic algorithms, and the like, to implement functionality as described herein.

Alternatively, and/or in addition, the application 222 may include one or more machine learning algorithms. Such machine learning algorithms may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, any suitable machine learning algorithm and/or deep learning algorithm and/or neural network is within the scope of present examples.

In examples where the application 222 includes one or more machine learning algorithms, the threshold 122, 124 are understood to comprise machine learning thresholds for respectively determining whether network load is above or below a respective threshold 122, 124.

While details of the base station 104, the cameras 108, the wireless communication devices 110, and the devices 114 are not depicted the base station 104, the cameras 108, the wireless communication devices 110, and the devices 114 may have components similar to the computing device 102 adapted, however, for the functionality thereof.

In particular, a camera 108 and/or a wireless communication device 110 and/or a cloud computing device, may include a controller implementing programming instructions for classifying scenes of video acquired by a camera 108 according to respective scene classification thresholds 126. In particular, such programming instructions may include respective one or more machine learning algorithms (and/or artificial intelligence) for classifying scenes of video acquired by a camera 108 according to respective scene classification thresholds 126.

Attention is now directed to FIG. 3, which depicts a flowchart representative of a method 300 to control network load at a base station. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The method 300 of FIG. 3 is one way that the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while the method 300 is described with respect to the given sector 106-1, the method 300 may be implemented for any of the sectors 106.

Furthermore, while the method 300 is described with respect to the base station 104, the method 300 may be implemented for a plurality of base stations. For example, the computing device 102 may be implementing the method 300 to control network load at the base station 104, as well as other base stations.

Furthermore, herein, reference is made to network load and to a network loading level, which may be interchangeable. In particular, however, the term "network loading level" may refer to a specific number of PRBs, and the like, being utilized on the given sector 106-1, and which may be compared to the thresholds 122, 124, though a network loading level may be in any suitable units.

At a block 302, the controller 218, and/or the computing device 102, determines a network loading level on a given sector 106-1 of a base station 104, the base station 104 in communication with the wireless cameras 108 categorized according to rank.

Network loading level may be determined on a real-time basis (e.g., less than a millisecond basis), on a near real-time basis (e.g., less than a second or minute basis), or on a slower basis (e.g., less than every 15 minutes or hour). In some examples, a frequency at which network loading level is determined may depend on one or more of the content of scenes in video acquired one or more of the cameras 108, and loading on the communication network 112, and the like. For example, when given content (e.g. as previously described) is detected in a scene in video acquired one or more of the cameras 108, a frequency at which network loading level is determined may increase, and when such given content is no longer detected, a frequency at which network loading level is determined may decrease. Similarly, when loading on the communication network 112 rises above a threshold level, frequency at which network loading level is determined may increase, and when loading on the communication network 112 decreases to below the threshold level, a frequency at which network loading level is determined may decrease; such a threshold level may be 90%, 95%, 99% of network capacity of the communication network 112, and the like.

In some examples, the method 300 may further include, for example at, or prior to the block 302, the controller 218 and/or the computing device 102 detecting the wireless cameras 108 in communication with the given sector 106-1. For example the controller 218 and/or the computing device 102 may control the base station 104 to broadcast a request that the wireless cameras 108 identify themselves, and the wireless cameras 108 may receive such a request and respond with any suitable identifying information, which may include, but is not limited to, a respective identifier 118, and which may include a base station identifier, a sector identifier, and the like. In some of these examples, the identifying information received from the wireless cameras 108 may include a respective rank 120, and the identifier 118 and respective ranks 120 may be stored at the memory 116 (e.g. and/or a respective rank 120 may be determined in any suitable manner).

In other examples, wireless cameras 108 that are actively in communication with the given sector (e.g., 106-1) may be periodically and/or automatically detected, and such detection may be based on identifiers comprising, one or more of: any suitable camera and/or user equipment (UE) and/or modem naming convention; Access Point Names (APN), an assigned over-the-air (OTA) camera priority level; an assigned wired network priority level; camera and/or UE SIM (Subscriber Identification Module) profile; radio resource controller (RRC) data; UE and/or modem attachment data; certified professional installer data; and the like, amongst other possibilities. Such information may be available from a network management system and/or similar controller function of a wireless network, such as the communication network 112, and the like. For example, UE/modems (e.g. the wireless communication devices 110) operating on a 4G LTE communications system that maintain continual attachment to the system 100, and periodically send certain size data packets in bursts (e.g., send 30-60K bits every 20-50 ms), may be automatically classified as a camera video stream/UE in the system 100. Similarly, UE/modems operating in the system 100 using a particular APN (e.g., a 'high priority video data' APN) may be automatically classified as a camera video stream/UE in the system 100. In this manner, any number of cameras 108 communicating on a particular sector (e.g., such as the given sector 106-1) may be dynamically tracked and controlled via the method 300.

Furthermore, an identifier of a camera 108 may be changed in the system 100 (e.g. as a camera 108 changes locations, and/or under any other suitable conditions), and detection of the camera 108 occur any suitable number of times.

However, any suitable process may be used to identify which cameras 108 are in communication with a given sector 106. Indeed, he the described automatic camera identification mechanisms (e.g., and/or any other suitable camera identification mechanisms) may enable the system 100 to dynamically track which cameras 108 are connected to which sectors 106 in the system 100, and may further enable tracking of even mobile cameras and/or sensors.

In some examples, the method 300 may further include, for example at, or prior to the block 302, the controller 218 and/or the computing device 102 determining ranks 120 of the wireless cameras 108 from the memory 116 that stores the respective identifiers 118 of the wireless cameras 108 in association with the ranks 120. As has already been described, the ranks 120 and/or the identifiers 118 may be dynamic and may be determined any suitable number of times and/or at any suitable frequency.

In some examples, the sector network loading level may be determined from PRB usage data determined from the given sector 106-1 of the base station 104. The PRB usage data may be received from a network management system (NMS) which may track such PRB usage data at the base station 104. Alternatively and/or in addition, the PRB usage data may be determined via any other suitable component of the system 100 (e.g. such computing resources at the base station 104, and the like). Other sector network loading metrics may include, but are not limited to, a current throughput rate (or bit rate) per sector 106, a number of connected devices (e.g. which may be of a similar type) per sector 106, interference levels per sector 106, and the like, amongst other possibilities. As described above, the network loading level for a given sector 106 may be determined at any suitable time, including, but not limited to, on a periodic basis, and the like.

At a block 304, the controller 218, and/or the computing device 102, compares the network loading level (e.g., a present network loading level) with the first threshold 122.

When the network loading level exceeds (e.g. or is at) the first threshold 122 (e.g. a "YES" decision at the block 304), at a block 306 the controller 218, and/or the computing device 102, adjusts a respective scene classification threshold 126 of a lowest rank group of the wireless cameras 108 (e.g. the fourth group of the cameras 108-4) to a value that decreases a likelihood of scenes of the lowest rank group of the wireless cameras 108 being classified at a higher scene interest level. In particular, scenes classified according to the higher scene interest level are understood to be streamed by the wireless cameras 108 at a quality higher than other scenes classified to a lower scene interest level, thereby controlling the wireless cameras 108 of the lowest rank group, that generate respective scenes according to the lower scene interest level, to lower their respective network loading on the given sector 106-1.

From the block 306, the method 300 may again be implemented, and the computing device 102 may again determine the network load at the block 302.

Indeed, implementation of the block 306 may be iterative, such that the respective scene classification threshold 126 of a (e.g., next) lowest rank group of the cameras 108 is iteratively adjusted, for example in a feedback loop comprising the blocks 302, 304, 306, until the network loading level is determined to be below the first threshold 122 at the block 304. In one example, scene classification threshold 126 of a lowest rank group of the cameras 108 may be adjusted to reduce their average required load presented to the given sector 106-1, followed by adjusting a scene classification threshold 126 of a next lowest rank group of the cameras 108, and so on, until the network loading level of the given sector 106-1 is below the first threshold 122. Other examples of adjusting scene classification threshold 126 of a lowest rank group of the cameras 108 are described below. In general, implementation of the block 306 may have a net effect of controlling and/or limiting an overall sector load to a maximum value that may correspond to the first threshold 122 and/or about the first threshold 122. Sector network loading level may generally into account all traffic carried by a particular sector 106 (e.g., including other non-video applications utilizing communications resources on the sector 106). Hence, the first threshold 122 may also be selected to account for some uncontrolled or dynamic loading on a sector 106 by providing some headroom below maximum achievable sector utilization levels.

Regardless, at each (e.g. iterative) implementation of the block 306, the respective scene classification threshold 126 of a lowest rank group of the cameras 108 may be raised by a given amount (e.g. such as "4", "5", "6", and the like, amongst other possibilities) and/or by a given percentage (e.g. such as 5%, 10%, 15%, and the like, amongst other possibilities), until the network loading level is determined to be below the first threshold 122 at the block 304.

Hence, in these examples, the method 300 may further comprise, the controller 218 and/or the computing device

102, further comprising, after adjusting the respective scene classification threshold 126 of the lowest rank group of the wireless cameras 108: when the network loading level continues to exceed the first threshold 122, iteratively adjusting the respective scene classification threshold 126 of the lowest rank group of the wireless cameras 108 to respective values that successively decrease the likelihood of the respective scenes of the lowest rank group of the wireless cameras 108 being classified at a respective higher scene interest level, until the network loading level is below the first threshold 122, or the respective scene classification threshold 126 of all of the lowest rank group of the wireless cameras 108 are at a given value.

For example, the iterative adjustment of the respective scene classification threshold 126 of the lowest rank group of the wireless cameras 108 may occur until the respective scene classification threshold 126 is at a given value such as "96", "97", "99" and the like, amongst other possibilities, to ensure that scenes of video acquired by the lowest rank group of the wireless cameras 108 may be classified as being less "interesting", and hence streamed at lower average throughput levels. In general scenes acquired by a lowest ranked group of cameras 108 may still contain "interesting" scenes (and be streamed at higher quality and throughput levels), but the likelihood of such occurrences is reduced by the scene classification threshold adjustments described herein.

Other iterative schemes are within the scope of the present specification.

For example, at successive implementations of the block 306, rather than adjust the respective scene classification threshold 126 of the lowest rank group of the wireless cameras 108, the respective scene classification threshold 126 of a next lowest rank group of the wireless cameras 108 may be adjusted. In particular, at a first iteration of the block 306, the respective scene classification threshold 126 of a lowest rank fourth group of the wireless cameras 108-4 may be adjusted, at a second iteration of the block 306 (e.g., if needed), the respective scene classification threshold 126 of a next lowest rank third group of the wireless cameras 108-3 may be adjusted, at a third iteration of the block 306 (e.g., if needed), the respective scene classification threshold 126 of a next lowest rank second group of the wireless cameras 108-2 may be adjusted, and at a fourth iteration of the block 306 (e.g., if needed), the respective scene classification threshold 126 of yet a next lowest rank first group of the wireless cameras 108-1 (e.g. the highest rank group) may be adjusted, until the first threshold 122 for average network loading level is not exceeded. The network loading level may optionally be filtered, averaged or smoothed in any fashion without any loss of generality.

Put another way, the method 300 may further comprise, the controller 218 and/or the computing device 102, after adjusting the respective scene classification threshold 126 of the lowest rank group of the wireless cameras 108 (e.g. at a first implementation of the block 306), when the network loading level continues to exceed the first threshold 122, adjusting the respective scene classification threshold 126 of a next lowest rank group of the wireless cameras 108 to a respective value that decreases the likelihood of the respective scenes of the next lowest rank group of the wireless cameras 108 being classified at a respective higher scene interest level, thereby controlling the next lowest rank group of the wireless cameras 108 that generate the respective scenes according to a respective lower scene interest level to lower their respective network loading on the given sector 106-1.

Put yet another way, the method 300 may further comprise, the controller 218 and/or the computing device 102, after adjusting the respective scene classification threshold 126 of the lowest rank group of the wireless cameras 108 (e.g. at a first implementation of the block 306): when the network loading level continues to exceed the first threshold 122, iteratively adjusting the respective scene classification threshold 126 of next lowest rank groups of the wireless cameras 108 to a respective value that decreases the likelihood of the respective scenes of the next lowest rank groups of the wireless cameras 108 being classified at a respective higher scene interest level, until the network loading level is below the first threshold 122 (e.g. as determined at the block 304).

Returning to the block 304, when the network loading level does not exceed (e.g. or is not at), and/or is below, the first threshold 122 (e.g. a "NO" decision at the block 304), at a block 308 the controller 218 and/or the computing device 102 may compare the network loading level with the second threshold 124.

When the network loading level is below (e.g. or is at) the second threshold 124 (e.g. a "YES" decision at the block 308), at a block 310 the controller 218, and/or the computing device 102, adjusts the respective scene classification threshold 126 of a highest rank group of the wireless cameras 108 (e.g. the first group of the cameras 108-1) to a respective value that increases the likelihood of the respective scenes of the highest rank group of the wireless cameras 108 being classified at a respective higher scene interest level.

For example, the respective scene classification threshold 126 of a highest rank group of the wireless cameras 108 may be lowered by a given amount (e.g. such as "4", "5", "6", and the like, amongst other possibilities) and/or by a given percentage (e.g. such as 5%, 10%, 15%, and the like, amongst other possibilities). From the block 310, the method 300 may again be implemented, and the computing device 102 may again determine the network load at the block 302.

Indeed, similar to the block 306, implementation of the block 310 may be iterative, such that the respective scene classification threshold 126 of a highest rank group of the cameras 108 is iteratively adjusted, for example in a feedback loop comprising the blocks 302, 308, 310, until the network loading level is determined to be above the second threshold 124 at the block 308. Furthermore, in some examples, the blocks 302, 308, 310 may implemented, and/or iteratively implemented, independent of the remaining blocks of the method 300.

As such, at each (e.g. iterative) implementation of the block 310, the respective scene classification threshold 126 of a highest rank group of the cameras 108 may be lowered by a given amount and/or by a given percentage, until the network loading level is determined to be above the second threshold 124 at the block 308.

Put another way, the method 300 may further comprise, the controller 218 and/or the computing device 102, when the network loading level is below the second threshold 124, lower than the first threshold 122, iteratively adjusting the respective scene classification thresholds 126 of a highest rank group of the wireless cameras 108 to respective values that successively increase the likelihood of the respective scenes of the highest rank group of the wireless cameras 108 being classified at a respective higher scene interest level, until the network loading level is above the second threshold 124. In general, higher scene classification levels result in higher average throughput requirements (and video quality) for the affected cameras 108. In some examples the first threshold 122 and/or the second threshold 124 may be dynamic and adjusting of the first threshold 122 and/or the second threshold 124 may be based on a variety of factors. For example, when there are one or more incidents occurring in a communication systems coverage area of the base station 104 (e.g. as determined by any suitable component of the system 100), the first threshold 122 and/or the second threshold 124 may be increased to increase video feed quality of the cameras 108.

However, other iterative schemes are within the scope of the present specification.

For example, at successive implementations of the block 310, rather than adjust the respective scene classification threshold 126 of the highest rank group of the wireless cameras 108, the respective scene classification threshold 126 of a next highest rank group of the wireless cameras 108 may be adjusted. In particular, at a first iteration of the block 310, the respective scene classification threshold 126 of a highest rank first group of the wireless cameras 108-1 may be adjusted, at a second iteration of the block 310 (e.g. if needed), the respective scene classification threshold 126 of a next highest rank second group of the wireless cameras 108-2 may be adjusted, at a third iteration of the block 310 (e.g. if needed), the respective scene classification threshold 126 of a next highest rank third group of the wireless cameras 108-3 may be adjusted, and at a fourth implementation of the block 310 (e.g. if needed), the respective scene classification threshold 126 of yet a next highest rank fourth group of the wireless cameras 108-4 may be adjusted, in order to increase average network load above the second threshold 124.

Put another way, the method 300 may further comprise, the controller 218 and/or the computing device 102, when the network loading level is below the second threshold 124, lower than the first threshold 122, iteratively adjusting the respective scene classification threshold 126 of next highest rank groups of the wireless cameras 108, beginning with a highest rank group of the wireless cameras 108, to a respective value that increases the likelihood of the respective scenes of the next highest rank groups of the wireless cameras 108 being classified at a respective higher scene interest level, until the network loading level is above the second threshold 124.

Returning to the block 308, when the network loading level is not below (e.g. or at), or is above, the second threshold 124 (e.g. a "NO" decision at the block 308), the method 300 may again be implemented, and the computing device 102 may again determine the network load at the block 302.

Hence, in general the method 300 may be implemented to control the network loading level at the given sector 106-1 to be between the first threshold 122 and the second threshold 124, and to maximize the likelihood of higher interest scenes acquired by higher ranked cameras 108 to be streamed at higher quality.

The method 300 may include yet other aspects.

For example, when the network loading level is below the first threshold 122 (e.g. a "NO" decision at the block 304), and the respective scene classification threshold 126 of groups of the cameras 108 were previously adjusted and/or iteratively adjusted at the block 306, the controller 218 and/or the computing device 102 may iteratively control the respective scene classification threshold 126 to a default respective scene classification threshold 126 and/or a starting respective scene classification threshold 126, for example in a reverse order in which the groups of the cameras 108 were previously adjusted. For example, such a default respective scene classification threshold 126 and/or a starting respective scene classification threshold 126 may be "80" and/or any other suitable value. Hence, when the respective scene classification threshold 126 of the groups of the cameras 108 was adjusted at the block 306 in an order of the fourth, third, second and first groups of the cameras 108, the respective scene classification threshold 126 of the groups of the cameras 108 may be adjusted back towards a default and/or starting respective scene classification threshold 126 in an order of the first, second, third and fourth groups of the cameras 108. Furthermore, such adjustment may occur in conjunction with the computing device 102 attempting to control the network loading level on the given sector 106-1 to be between the first threshold 122 and the second threshold 124.

Similarly, when the network loading level is above the second threshold 124 (e.g. a "NO" decision at the block 308), and the respective scene classification threshold 126 of groups of the cameras 108 were previously adjusted and/or iteratively adjusted at the block 310, the controller 218 and/or the computing device 102 may iteratively control the respective scene classification threshold 126 to a default respective scene classification threshold 126 and/or a starting respective scene classification threshold 126, for example in a reverse order in which the groups of the cameras 108 were previously adjusted. For example, such a default respective scene classification threshold 126 may be "80" and/or a starting respective scene classification threshold 126 and/or any other suitable value. Hence, when the respective scene classification threshold 126 of the groups of the cameras 108 was adjusted at the block 310 in an order of the first, second, third and fourth groups of the cameras 108, the respective scene classification threshold 126 of the groups of the cameras 108 may be adjusted back to a default and/or starting respective scene classification threshold 126 in an order of the fourth, third, second and first groups of the cameras 108. Furthermore, such adjustment may occur in conjunction with the computing device 102 attempting to control the network loading level on the given sector 106-1 to be between the first threshold 122 and the second threshold 124.

It is understood that the method 300 may be implemented for any of the sectors 106, and/or for other base stations. For example, the method 300 may further comprise the controller 218 and/or the computing device 102 performing a network loading level determination and scene classification threshold adjustment for respective cameras 108 on other sectors 106 of the base station 104, such as the sectors 106-2, 106-3.

Attention is next directed to FIG. 4, FIG. 5, FIG. 6, FIG. 7, FIG. 8, FIG. 9, FIG. 10, FIG. 11, FIG. 12, and FIG. 13, which depict aspects of the method 300. FIG. 4, FIG. 5, FIG. 6, FIG. 7, FIG. 8, FIG. 9, FIG. 10, FIG. 11, FIG. 12, and FIG. 13 are similar to FIG. 1, with like components having like numbers. Furthermore, while for simplicity not all components of the system 100 of FIG. 1 are depicted in FIG. 4, FIG. 5, FIG. 6, FIG. 7, FIG. 8, FIG. 9, FIG. 10, FIG. 11, FIG. 12, and FIG. 13, such components may be present. For example in FIG. 4, FIG. 5, FIG. 6, FIG. 7, FIG. 8, FIG. 9, FIG. 10, FIG. 11, FIG. 12, and FIG. 13, the devices 109 and the wireless communication devices 110 are omitted, but may be present in some examples.

Figure 4:
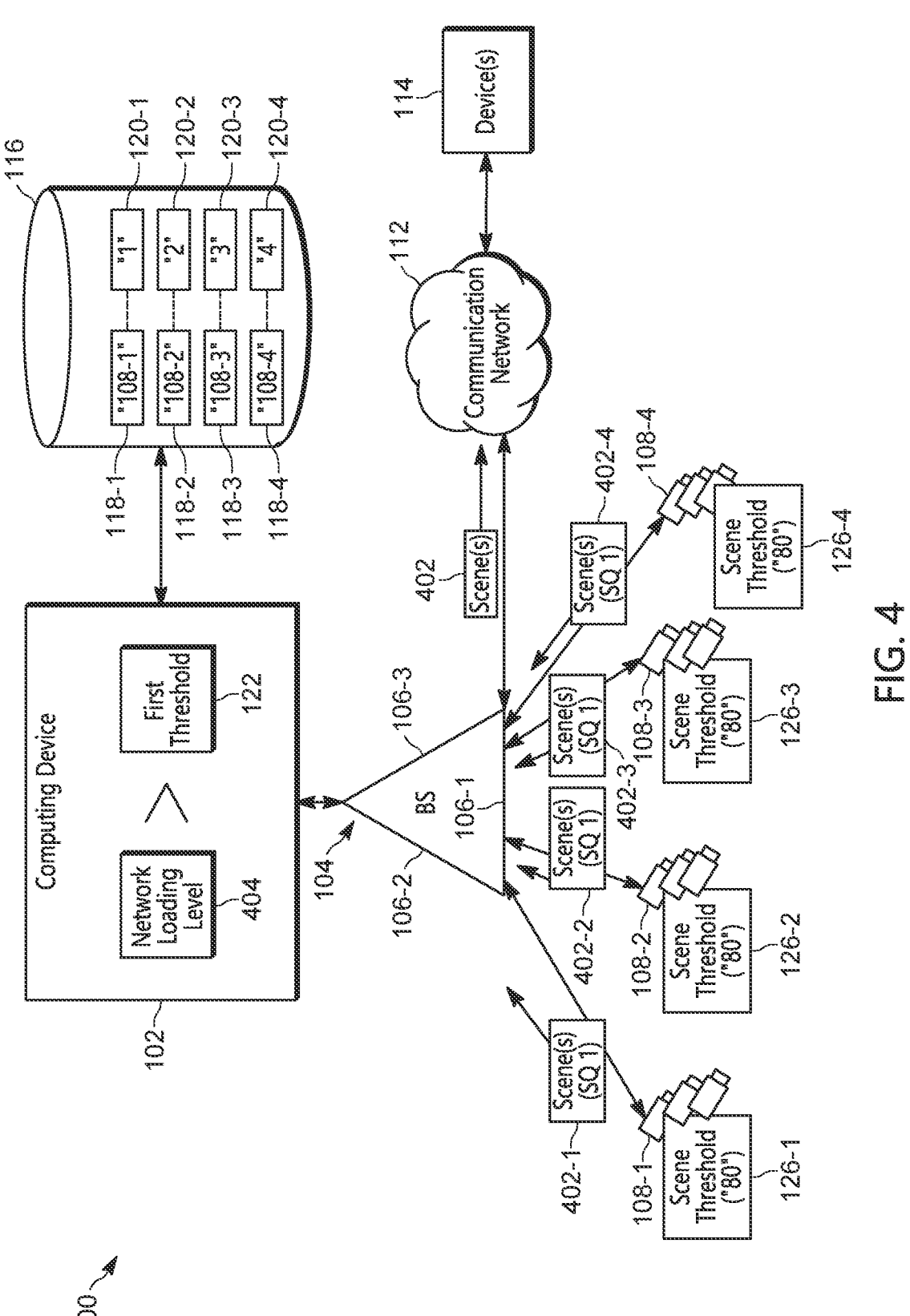
FIG. 4 depicts the system of FIG. 1 implementing aspects of a method to control network load at a base station, to decrease network load, in accordance with some examples.

Attention is next directed to FIG. 4 which depicts the cameras 108-1, 108-2, 108-3, 108-4 streaming respective scenes 402-1, 402-2, 402-3, 402-4 (e.g. scenes 402 and/or a scene 402) of videos acquired by the cameras 108, on respective upload communication links to the given sector

106-1 of the base station 104. Respective scenes 402 may originate from any suitable one or more cameras 108 of a group.

Furthermore, as depicted, the scenes 402 are transmitted according to a first service quality, labelled "SQ 1" in FIG. 4. It is understood that such a first service quality may correspond to a high quality video (e.g., which may be associated with a high quality of service, a high priority stream, an important and/or "interesting" stream, etc.). Hence, in these examples, the cameras 108 may be determining that the scenes 402 have respective scores above respective scene classification thresholds 126 of "80", and are hence streaming the scenes 402 at the first (e.g. higher) quality. While not depicted, some scenes 402 having have respective scores below respective scene classification thresholds 126 may be streamed at a lower quality.

As depicted, the scenes 402 are received by the base station 104 and streamed to the one or more devices 114 via the communication network 112 or via any other suitable networks, such as any suitable communication network for downlinking video (e.g., including, but not limited to, a cellular communication network, and the like).

As also depicted in FIG. 4, the computing device 102 determines (e.g. at the block 302 of the method 300) a network loading level 404 of the given sector 106-1 and compares (e.g. at the block 304 of the method 300) the network loading level 404 to the first threshold 122. As depicted, computing device 102 determines that the network loading level 404 is greater than the first threshold 122 (e.g. a "YES" decision at the block 304 of the method 300).

Figure 5:
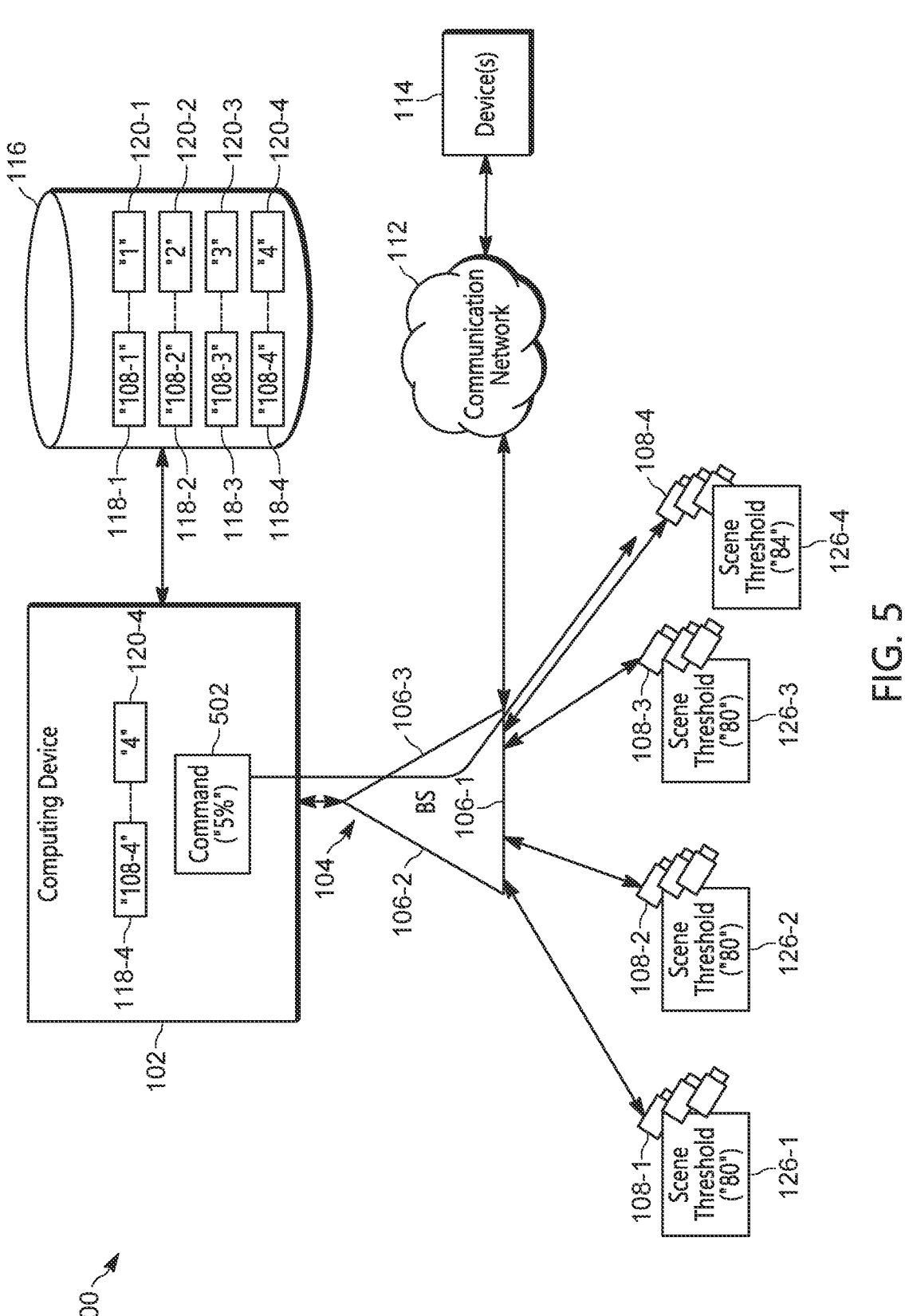
FIG. 5 depicts the system of FIG. 1 implementing further aspects of a method to control network load at a base station, to decrease network load, in accordance with some examples.

Attention is next directed to FIG. 5, which is understood to follow in time from FIG. 4. While the scenes 402 are not depicted for simplicity in FIG. 5, they may nonetheless be present.

As depicted in FIG. 5, the computing device 102 identifies the lowest rank group of the cameras 108 by processing the ranks 120 to determine that the fourth group of the cameras 108-4 having the identifiers 118-4 are associated with the lowest rank 120-4 of "4".

As such, the computing device 102 adjusts (e.g. at the block 306) respective (e.g., machine learning and/or artificial intelligence driven) scene classification thresholds 126-4 of the lowest rank fourth group of the cameras 108-4 by transmitting a command 502 to the fourth group of the cameras 108-4 to increase the respective scene classification threshold 126-4 by "5%". The command 502 may be specifically transmitted using the identifiers 118-4 of the fourth group of the cameras 108-4.

Alternatively, and/or in addition, rather than the command 502 being specifically transmitted to the fourth group of the cameras 108-4, the command 502 may be broadcast on the given sector 106-1 and, in these examples, the command 502 may include any suitable identifiers of the fourth group of the cameras 108-4, including, but not limited to, the identifiers 118-4, and/or the rank 120-4. A camera 108 receiving the command 502 in such a format may be configured to process the command 502 only when a respective identifier and/or rank stored in a respective memory thereof matches an identifier 118-4 and/or the rank 120-4 of the command 502. In other embodiments, the cameras 108 may poll a location (e.g., a central server collocated with an NMS either on-premises or in the cloud) to obtain their current settings, including their current scene classification thresholds 126.

As depicted, it is understood that the fourth group of the cameras 108-4 have received the command 502 and adjusted the respective scene classification threshold 126-4 by an increase of "5%", for example from "80" to "84".

Figure 6:
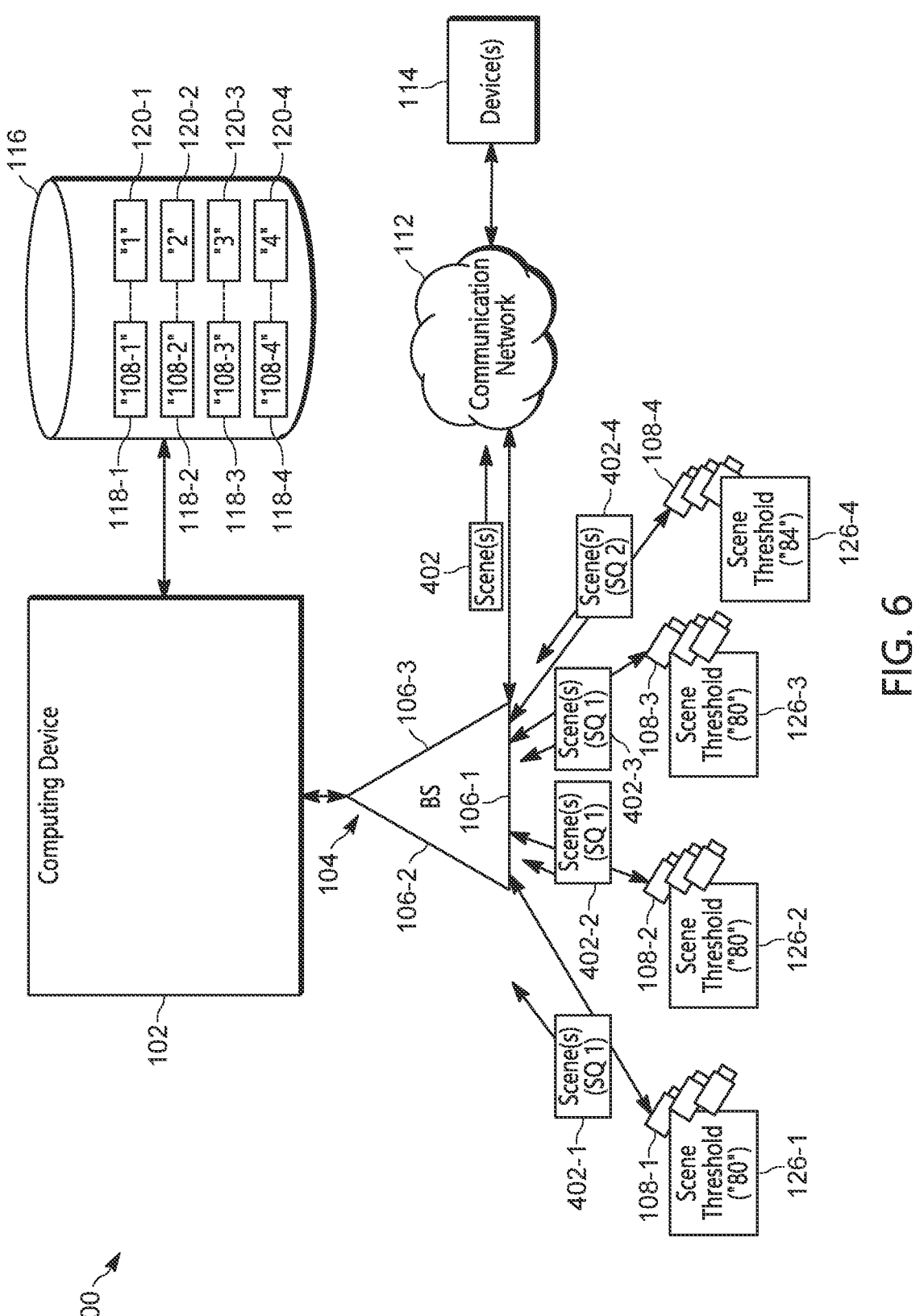
FIG. 6 depicts the system of FIG. 1 implementing further aspects of a method to control network load at a base station, to decrease network load, in accordance with some examples.

Attention is next directed to FIG. 6, which is understood to follow in time from FIG. 5. As depicted, a quality of the scenes 402-4 (or a portion thereof) streamed by the fourth group of the cameras 108-4 has changed from the first service quality of "SQ 1" to a second service quality of "SQ 2", lower than the first service quality. It is understood that such a second service quality may correspond to a lower quality video (at least compared to higher quality video).

Hence, in these examples, the fourth group the cameras 108-4 may be determining that the scenes 402-4 (or a portion thereof) have respective scores below the adjusted respective scene classification thresholds 126-4 of "84" (and which may otherwise be above the previous respective scene classification thresholds 126-4 of "80"), and are hence streaming the scenes 402-4 at the second quality. While not depicted, some scenes 402-4 having respective scores above the adjusted respective scene classification thresholds 126 may be continued to be streamed at the first (e.g. higher) service quality.

It is further understood that the scenes 402-4 streamed at the second (e.g. lower) quality contribute less to network loading at the given sector 106-1 as previous scenes 402-4 streamed at first (e.g. higher) quality of service. As such, network loading on the given sector 106-1 may be reduced.

Figure 7:
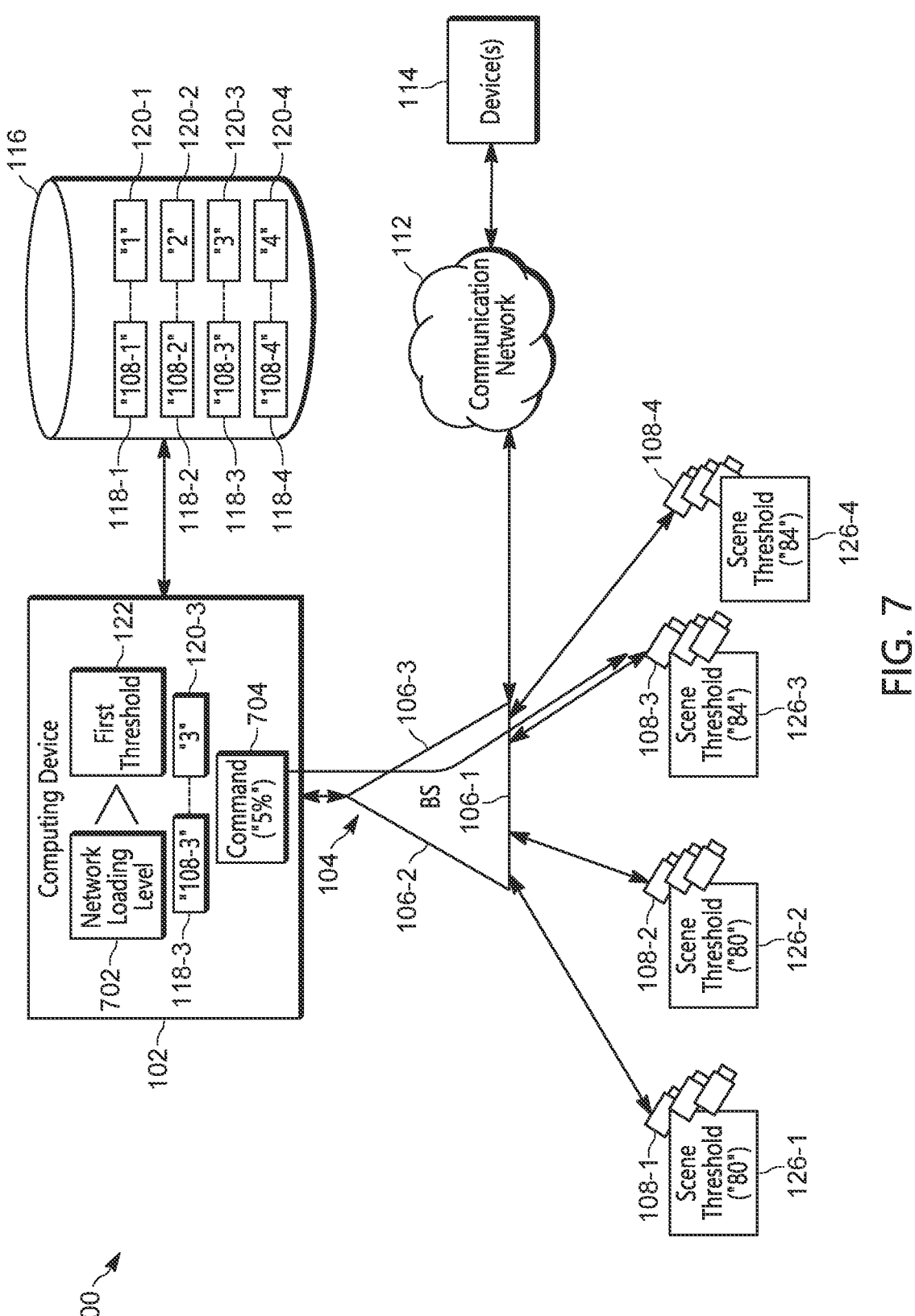
FIG. 7 depicts the system of FIG. 1 implementing further aspects of a method to control network load at a base station, to decrease network load, in accordance with some examples.

Attention is next directed to FIG. 7, which is understood to follow in time from FIG. 6. In FIG. 7, the computing device 102 again determines that a network loading level 702 of the given sector 106-1 continues to be greater than the first threshold 122. The computing device 102 identifies the next lowest rank group of the cameras 108 (e.g. next lowest relative to the lowest rank fourth group of the cameras 108-4) by processing the ranks 120 to determine that the third group of the cameras 108-3 having the identifiers 118-3 are associated with the next lowest rank 120-3 of "3".

As also depicted in FIG. 7, the computing device 102 adjusts (e.g. at a second implementation of the block 306) respective scene classification thresholds 126-3 of the next lowest rank third group of the cameras 108-3 by transmitting a command 704 to the third group of the cameras 108-3 to increase the respective scene classification threshold 126-3 by "5%" (e.g., as depicted to "84"). The command 704 may be specifically transmitted using the identifiers 118-3 of the third group of the cameras 108-3, or in any other suitable manner.

Figure 8:
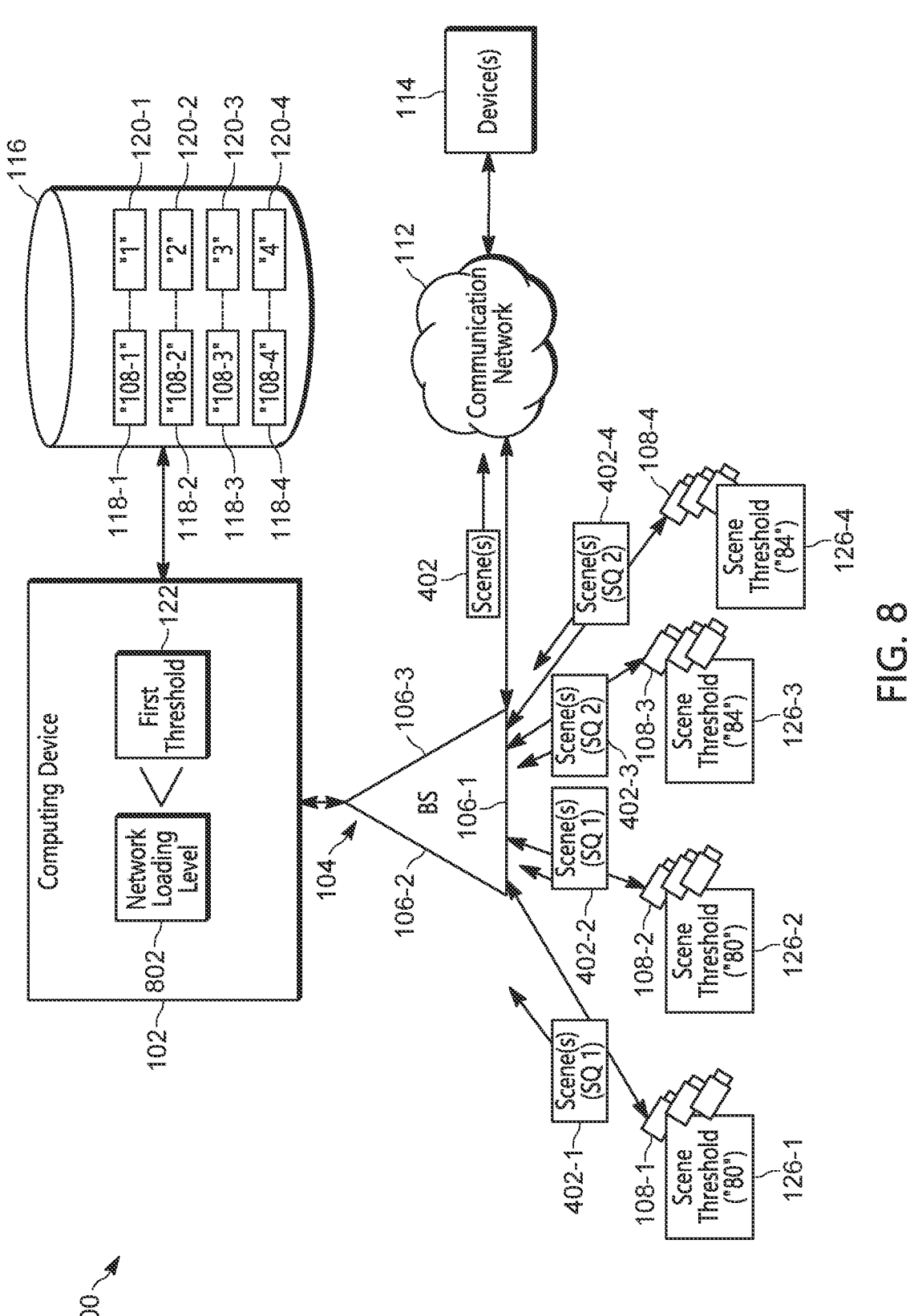
FIG. 8 depicts the system of FIG. 1 implementing further aspects of a method to control network load at a base station, to decrease network load, in accordance with some examples.

Attention is next directed to FIG. 8, which is understood to follow in time from FIG. 7. As depicted, a quality of the scenes 402-4 (or a portion thereof) streamed by the third group of the cameras 108-3 has changed from the first service quality of "SQ 1" to a second service quality of "SQ 2", lower than the first service quality. It is understood that such a second service quality may correspond to a lower quality video (at least compared to higher quality video).

Hence, in these examples, the third group the cameras 108-3 may be determining that the scenes 402-3 (or a portion thereof) have respective scores below the adjusted respective scene classification thresholds 126-3 of "84" (and which may otherwise be above the previous respective scene classification thresholds 126-3 of "80"), and are hence streaming the scenes 402-3 at the second service quality. While not depicted, some scenes 402-3 having have respective scores above the adjusted respective scene classification thresholds 126 may be continued to be streamed at the first (e.g. higher) service quality.

It is further understood that the scenes 402-3 streamed at the second (e.g. lower) service quality contribute less to network loading at the given sector 106-1 as previous scenes 402-3 streamed at the first (e.g. higher) service quality. As such, network loading on the given sector 106-1 may be reduced. Indeed, as also depicted in FIG. 6, the computing device 102 determines that a current network loading level 802 is below the first threshold 122 (e.g. a "NO" decision at the block 304 of the method 300). Hence, the iterative adjustment of the respective scene classification thresholds 126 of the lowest rank groups of the cameras 108, in an order of rank from lowest to highest, has resulted in a decrease of the network loading level on the given sector 106-1.

Figure 9:
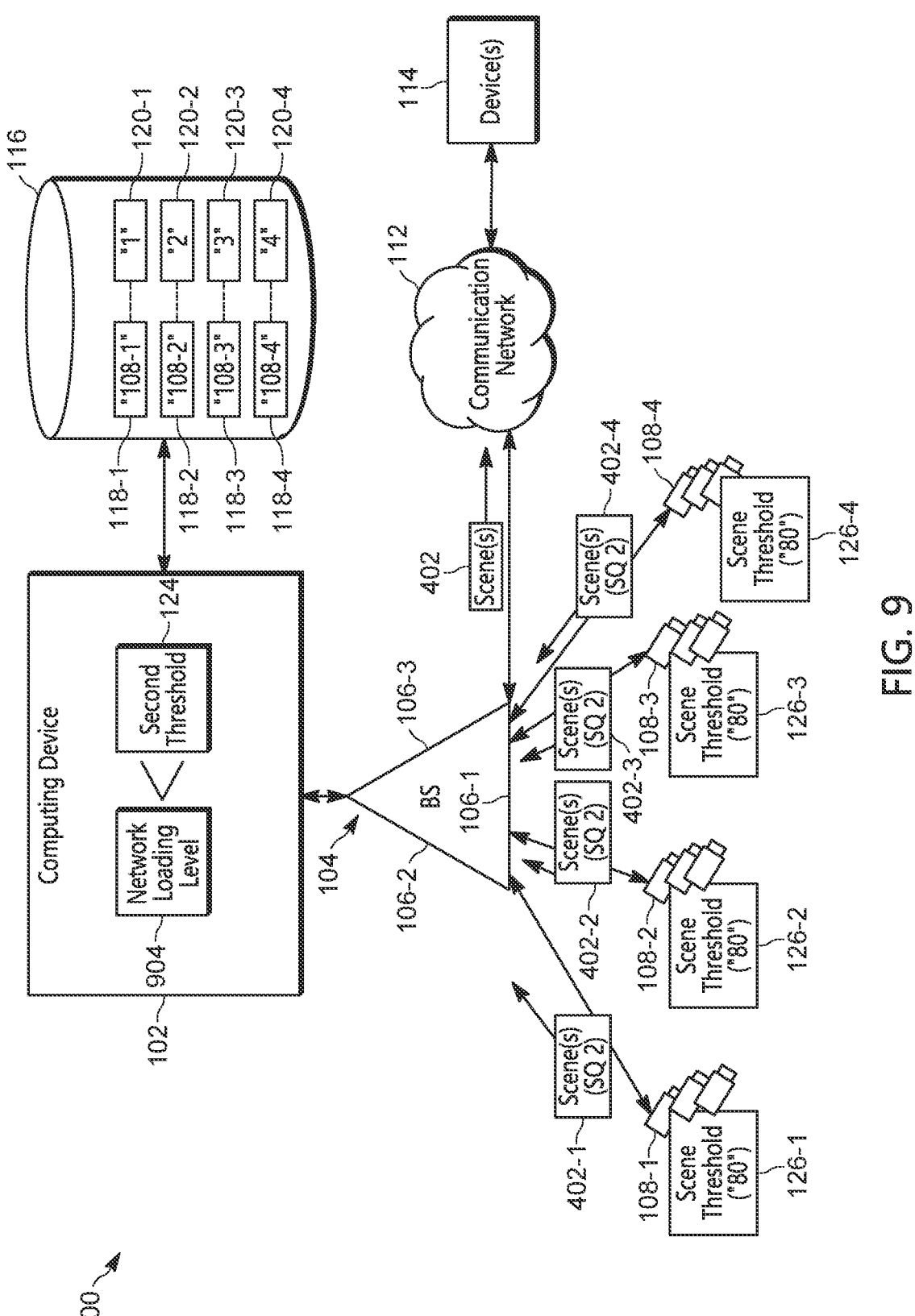
FIG. 9 depicts the system of FIG. 1 implementing aspects of a method to control network load at a base station, to increase network load when network load overhead is available, in accordance with some examples.

Attention is next directed to FIG. 9, which depicts the system 100 in a state similar to FIG. 4, with like components having like numbers. However, in this example, the groups of the cameras 108 are streaming at least some scenes 402 at the second service quality of "SQ 2", as the scores for such scenes 402 are understood to be below the respective scene classification thresholds 126 of "80".

Furthermore, in this example, the computing device 102 determines that a network loading level 904 of the given sector is below the second threshold 124 (e.g. a "YES" decision at the block 308 of the method 300). Hence, in this example, it is understood that there may be network load overhead available at the given sector 106-1 (e.g. to increase a network loading level thereof).

Figure 10:
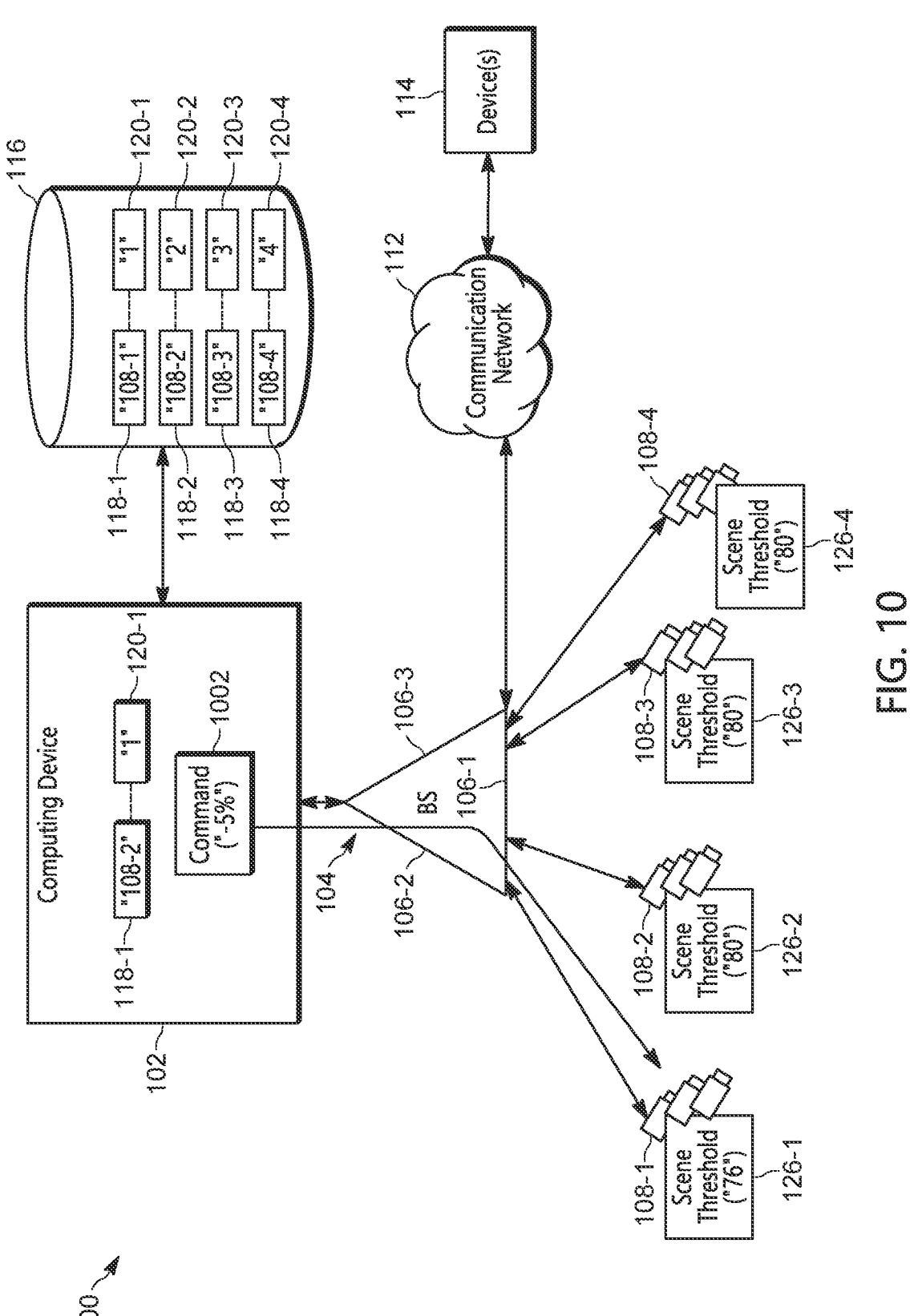
FIG. 10 depicts the system of FIG. 1 implementing aspects of a method to control network load at a base station, to increase network load when network load overhead is available, in accordance with some examples.

Attention is next directed to FIG. 10, which is understood to follow in time from FIG. 9. As in FIG. 5, while the scenes 402 are not depicted for simplicity in FIG. 10, they may nonetheless be present.

As depicted in FIG. 10, the computing device 102 identifies the highest rank group of the cameras 108 by processing the ranks 120 to determine that the first group of the cameras 108-1 having the identifiers 118-1 are associated with the highest rank 120-1 of "1".

As such, the computing device 102 adjusts (e.g. at the block 310) respective scene classification thresholds 126-1 of the highest rank first group of the cameras 108-1 by transmitting a command 1002 to the first group of the cameras 108-1 to reduce the respective scene classification threshold 126-4 by "−5%". The command 1002 may be specifically transmitted using the identifiers 118-1 of the first group of the cameras 108-1, or in any other suitable manner.

As depicted, it is understood that the first group of the cameras 108-1 have received the command 1002 and adjusted the respective scene classification threshold 126-4 by a decrease of "−5%", for example from "80" to "76".

Figure 11:
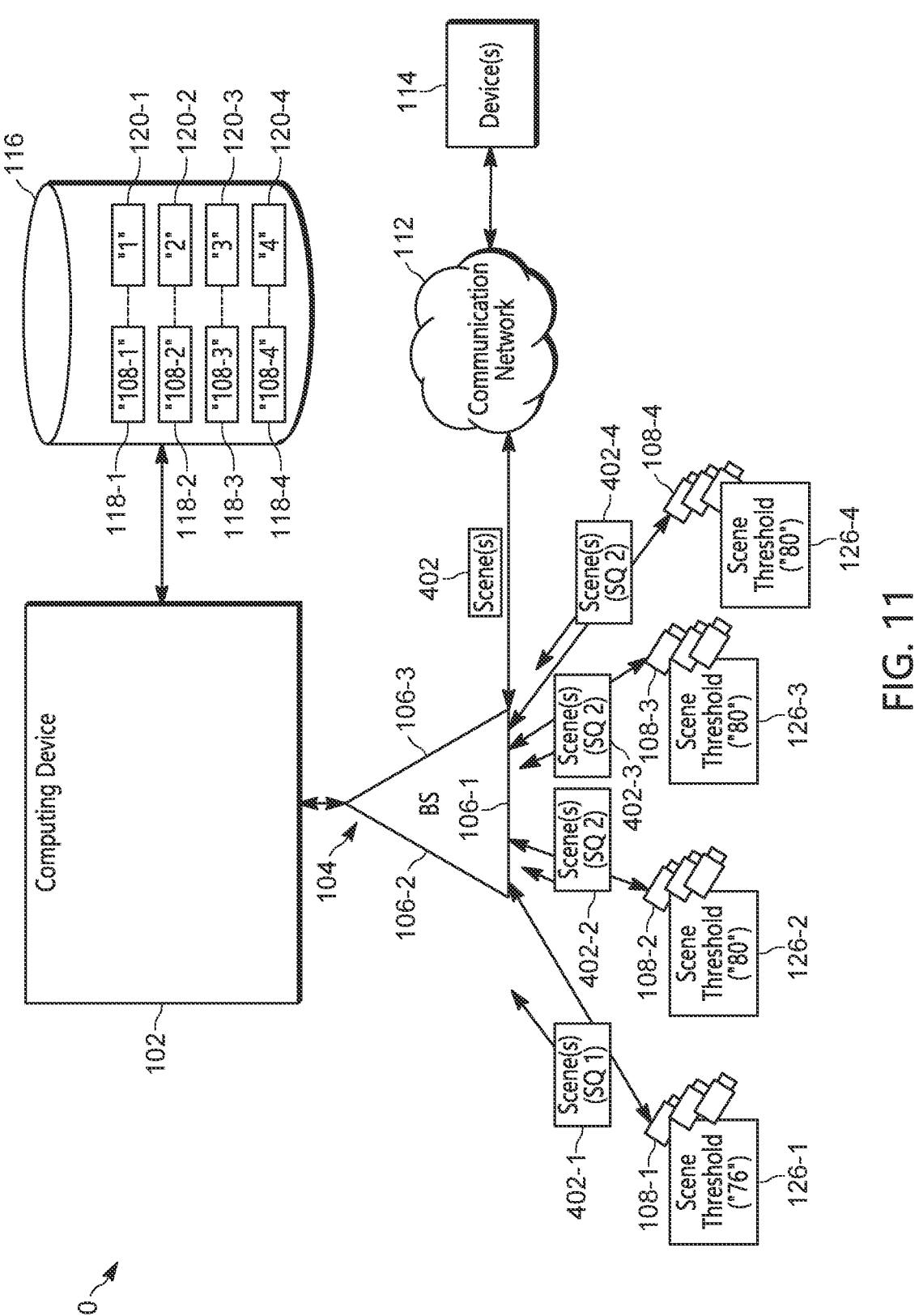
FIG. 11 depicts the system of FIG. 1 implementing aspects of a method to control network load at a base station, to increase network load when network load overhead is available, in accordance with some examples.

Attention is next directed to FIG. 11, which is understood to follow in time from FIG. 10. As depicted, a quality of the scenes 402-1 (or a portion thereof) streamed by the first group of the cameras 108-1 has changed from the second service quality of "SQ 2" to the first service quality of "SQ 1", higher than the second service quality. It is understood that such the first service quality may correspond to a higher quality video (at least compared to lower quality video).

Hence, in these examples, the first group the cameras 108-1 may be determining that the scenes 402-1 (or a portion thereof) have respective scores above the adjusted respective scene classification thresholds 126-1 of "76" (and which may otherwise be below the previous respective scene classification thresholds 126-1 of "80"), and are hence streaming the scenes 402-1 at the first (e.g. higher) service quality. While not depicted, some scenes 402-1 having have respective scores below the adjusted respective scene classification thresholds 126-1 may be continued to be streamed at the second (e.g. lower) service quality.

It is further understood that the scenes 402-1 streamed at the first (e.g. higher) service quality may contribute more to network loading at the given sector 106-1 as compared to previous scenes 402-1 streamed at the second (e.g. lower)

service quality, however as the network loading level 904 was below the second threshold 124, the given sector 106-1 may have sufficient overhead to increase such quality of the scenes 402-1.

Figure 12:
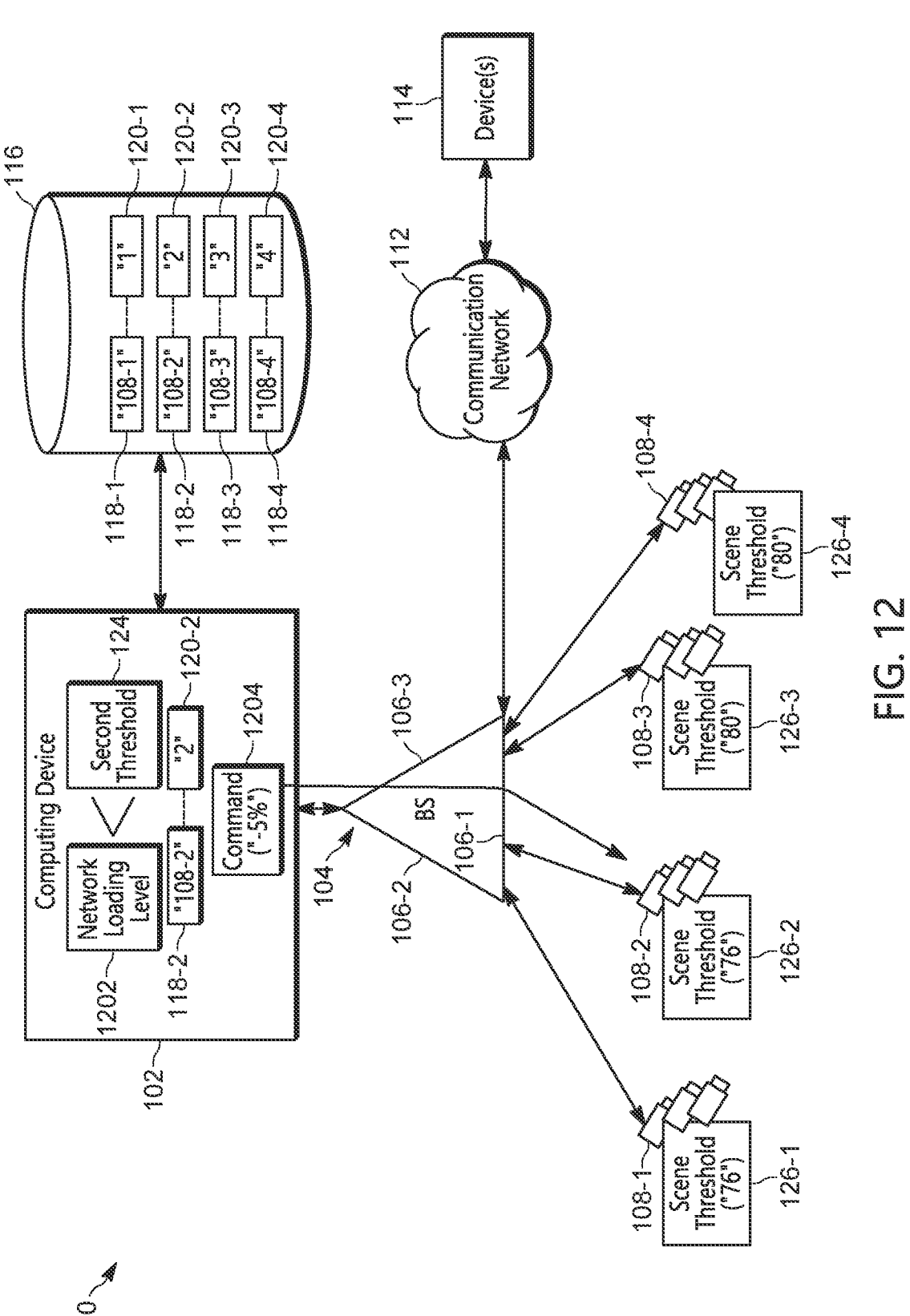
FIG. 12 depicts the system of FIG. 1 implementing aspects of a method to control network load at a base station, to increase network load when network load overhead is available, in accordance with some examples.

Attention is next directed to FIG. 12, which is understood to follow in time from FIG. 11. In FIG. 12, the computing device 102 again determines that a network loading level 1202 of the given sector 106-1 continues to be less than the second threshold 124. The computing device 102 identifies the next highest rank group of the cameras 108 (e.g. next highest relative to the highest rank first group of the cameras 108-1) by processing the ranks 120 to determine that the second group of the cameras 108-2 having the identifiers 118-2 are associated with the next highest rank 120-2 of "2".

As also depicted in FIG. 12, the computing device 102 again adjusts (e.g. at a second implementation of the block 310) respective scene classification thresholds 126-2 of the next highest rank second group of the cameras 108-2 by transmitting a command 1204 to the second group of the cameras 108-2 to decrease the respective scene classification threshold 126-2 by "−5%" (e.g. to "76"). The command 1204 may be specifically transmitted using the identifiers 118-2 of the second group of the cameras 108-2, or in any other suitable manner.

Figure 13:
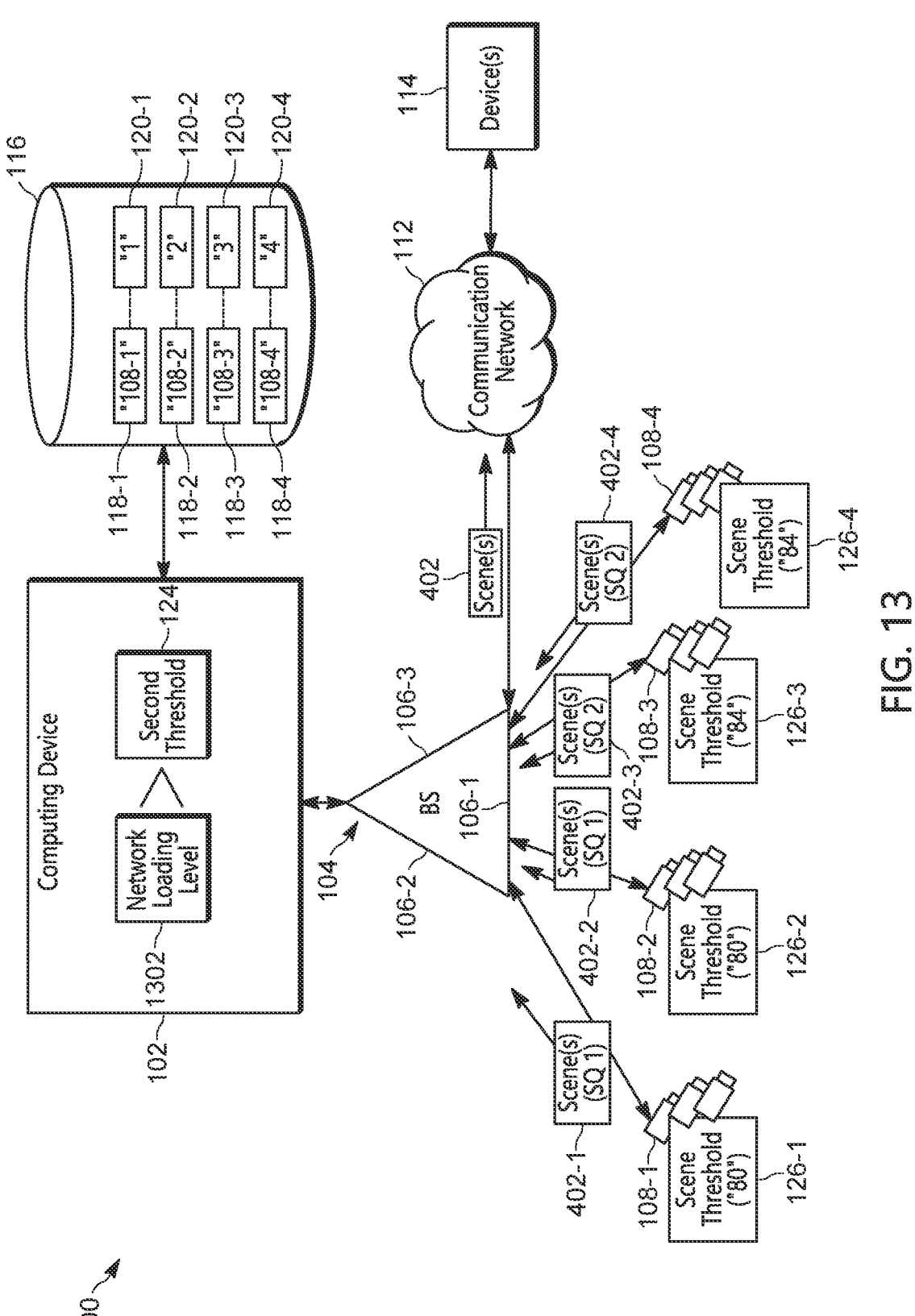
FIG. 13 depicts the system of FIG. 1 implementing aspects of a method to control network load at a base station, to increase network load when network load overhead is available, in accordance with some examples.

Attention is next directed to FIG. 13, which is understood to follow in time from FIG. 12. As depicted, a quality of the scenes 402-2 (or a portion thereof) streamed by the second group of the cameras 108-2 has changed from the second service quality of "SQ 2" to the first service quality of "SQ 1", higher than the second service quality. It is understood that such a first service quality may correspond to a higher quality video (at least compared to lower quality video).

Hence, in these examples, the second group the cameras 108-2 may be determining that the scenes 402-2 (or a portion thereof) have respective scores above the adjusted respective scene classification thresholds 126-2 of "76" (and which may otherwise be below the previous respective scene classification thresholds 126-2 of "80"), and are hence streaming the scenes 402-2 at the first service quality. While not depicted, some scenes 402-2 having have respective scores below the adjusted respective scene classification thresholds 126 may be continued to be streamed at the second (e.g. lower) service quality.

It is further understood that the scenes 402-2 streamed at the first (e.g. higher) quality may contribute more to network loading at the given sector 106-1 as compared to previous scenes 402-1 streamed at the second (e.g. lower) quality, however as the network loading level 904 was below the second threshold 124, the given sector 106-1 may have sufficient overhead to increase such quality of the scenes 402-1. Nonetheless, as depicted in FIG. 13, the current network loading level 1302 is above the second threshold 124, hence no further iterative adjustment (e.g. reduction) of the respective scene classification thresholds 126 may occur.

Furthermore, any suitable iterative scenarios are within the scope of the present specification. Each of the following scenarios assume that a network loading level is initially above the first threshold 122.

For example, the computing device 102 may iteratively adjust (e.g. lower) a respective scene classification threshold 126 of cameras 108 of a rank 120 of "4" (e.g., a lowest rank 120) until the network loading level has decreased below the first threshold 122, or until the respective scene classification threshold 126 of cameras 108 of a rank 120 of "4" has reached a minimum. Once respective scene classification threshold 126 of cameras 108 of a rank 120 of "4" has been adjusted to the minimum, and the network loading level remains above the first threshold 122, the computing device 102 may iteratively adjust (e.g. lower) a respective scene classification threshold 126 of cameras 108 of a rank 120 of "3" (e.g., a next lowest rank 120) until the network loading level has decreased below the first threshold 122, or until the respective scene classification threshold 126 of the cameras 108 of a rank 120 of "3" has reached a minimum. Once respective scene classification threshold 126 of cameras 108 of a rank 120 of "3" has been adjusted to the minimum, and the network loading level remains above the first threshold 122, the computing device 102 may iteratively adjust (e.g. lower) a respective scene classification threshold 126 of cameras 108 of a rank 120 of "2" (e.g., a next lowest rank 120) until the network loading level has decreased below the first threshold 122, or until the respective scene classification threshold 126 of the cameras 108 of a rank 120 of "2" has reached a minimum. Once respective scene classification threshold 126 of cameras 108 of a rank 120 of "2" has been adjusted to the minimum, and the network loading level remains above the first threshold 122, the computing device 102 may iteratively adjust (e.g. lower) a respective scene classification threshold 126 of cameras 108 of a rank 120 of "1" (e.g., a next lowest rank 120) until the network loading level has decreased below the first threshold 122, or until the respective scene classification threshold 126 of the cameras 108 of a rank 120 of "1" has reached a minimum. While no further adjustments to the respective scene classification thresholds 126 of the cameras 108 may occur in this example, the network loading level has nonetheless decreased.

In another examples, the computing device 102 may adjust (e.g. lower) a respective scene classification threshold 126 of cameras 108 of a rank 120 of "4" (e.g., a lowest rank 120) once. When the network loading level remains above the first threshold 122, the computing device 102 may adjust (e.g. lower) a respective scene classification threshold 126 of cameras 108 of a rank 120 of "3" (e.g., a next lowest rank 120). When the network loading level remains above the first threshold 122, the computing device 102 may adjust (e.g. lower) a respective scene classification threshold 126 of cameras 108 of a rank 120 of "2" (e.g., a next lowest rank 120). When the network loading level remains above the first threshold 122, the computing device 102 may adjust (e.g. lower) a respective scene classification threshold 126 of cameras 108 of a rank 120 of "1" (e.g., a next lowest rank 120). While no further adjustments to the respective scene classification thresholds 126 of the cameras 108 may occur in this example, the network loading level has nonetheless decreased.

In another examples, the computing device 102 may alternate adjusting (e.g. lower) a respective scene classification threshold 126 of cameras 108 of a given number of lowest ranks 120, for example a given number of times, and/or in any suitable order, before adjusting (e.g. lower) a respective scene classification threshold 126 of cameras 108 of higher ranks 120. For example, the computing device 102 may adjust (e.g. lower) a respective scene classification threshold 126 of cameras 108 of a rank 120 of "4", then a rank 120 of "3", than again of a rank 120 of "4", then again of a rank "3", comparing the network loading level to the first threshold 122 after each adjustment and continuing when the network loading level remains above the first threshold 122. When the network loading level continues to remains above the first threshold 122, the computing device 102 may adjust (e.g. lower) a respective scene classification threshold 126 of cameras 108 of a rank 120 of "2", then cameras 108 of a rank 120 of "4", then again of a rank 120 of "2", then of a rank 120 of "1". When the network loading level remains above the first threshold 122, the respective scene classification threshold 126 of the cameras 108 may continue to be adjusted in any suitable order, focusing on adjusting respective scene classification thresholds 126 of cameras 108 of lower ranked groups, and/or until the respective scene classification thresholds 126 of a group of the cameras 108 reach a minimum. In some of these examples, the groups of the cameras 108 of different ranks 120 may have different respective scene classification threshold 126 and/or different minimums thereof.

Similar to scenario 1, but each rank uses a different first threshold. I.e., keep adjusting rank 1 until its threshold has been met (or can be adjusted no further), then adjust rank 2 until its threshold has been met (or can be adjusted no further), etc.

Furthermore, all of the above examples may occur in reverse (e.g. starting with the highest ranked group of the cameras 108), and/or in any suitable order, when the network loading level is below the second threshold 126, and focusing on adjusting (e.g. increasing) respective scene classification thresholds 126 of cameras 108 of a higher ranked groups.

In this manner, adjustment of the respective scene classification thresholds 126 may be used to adjust loading network loading levels on a given sector 106 of the base station 104.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, train a machine learning algorithm, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
determining, via a computing device, a network loading level on a given sector of a base station, the base station in communication with wireless cameras categorized according to rank;
when the network loading level exceeds a first threshold, adjusting, via the computing device, a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector; and
after adjusting the respective scene classification threshold of the lowest rank group of the wireless cameras:
when the network loading level continues to exceed the first threshold, iteratively adjusting the respective scene classification threshold of next lowest rank groups of the wireless cameras to a respective value that decreases the likelihood of the respective scenes of the next lowest rank groups of the wireless cameras being classified at a respective higher scene interest level, until the network loading level is below the first threshold.

2. The method of claim 1,
wherein adjusting the respective scene classification threshold of a next lowest rank group of the wireless cameras to the respective value that decreases the likelihood of the respective scenes of the next lowest rank group of the wireless cameras being classified at the respective higher scene interest level includes controlling the next lowest rank group of the wireless cameras that generate the respective scenes according to a respective lower scene interest level to lower their respective network loading on the given sector.

3. The method of claim 1, further comprising, after adjusting the respective scene classification threshold of the lowest rank group of the wireless cameras:
when the network loading level continues to exceed the first threshold, iteratively adjusting the respective scene classification threshold of the lowest rank group of the wireless cameras to respective values that successively decrease the likelihood of the respective scenes of the lowest rank group of the wireless cameras being classified at a respective higher scene interest level, until the network loading level is below the first threshold or the respective scene classification threshold of all of the lowest rank group of the wireless cameras are at a given value.

4. The method of claim 1, further comprising:

when the network loading level is below a second threshold, lower than the first threshold, iteratively adjusting the respective scene classification threshold of next highest rank groups of the wireless cameras, beginning with a highest rank group of the wireless cameras, to a respective value that increases the likelihood of the respective scenes of the next highest rank groups of the wireless cameras being classified at a respective higher scene interest level, until the network loading level is above the second threshold.

5. The method of claim 1, further comprising:

when the network loading level is below a second threshold, lower than the first threshold, iteratively adjusting the respective scene classification threshold of a highest rank group of the wireless cameras to respective values that successively increase the likelihood of the respective scenes of the highest rank group of the wireless cameras being classified at a respective higher scene interest level, until the network loading level is above the second threshold.

6. The method of claim 1, further comprising:

determining ranks of the wireless cameras from a memory that stores respective identifiers of the wireless cameras in association with the ranks.

7. The method of claim 1, further comprising:

detecting the wireless cameras in communication with the given sector.

8. The method of claim 1, further comprising:

performing a network loading level determination and scene classification threshold adjustment for respective cameras on other sectors of the base station.

9. The method of claim 1, wherein the network loading level is determined from Physical-layer Resource Block (PRB) usage data determined from the base station.

10. A computing device comprising:

a controller; and a computer-readable storage medium having stored thereon program instructions that, when executed by the controller, cause the computing device to perform a set of operations comprising:

determining a network loading level on a given sector of a base station, the base station in communication with wireless cameras categorized according to rank;

when the network loading level exceeds a first threshold, adjusting a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector; and adjusting the respective scene classification threshold of the lowest rank group of the wireless cameras:

when the network loading level continues to exceed the first threshold, iteratively adjusting the respective scene classification threshold of next lowest rank groups of the wireless cameras to a respective value that decreases the likelihood of the respective scenes of the next lowest rank groups of the wireless cameras being classified at a respective higher scene interest level, until the network loading level is below the first threshold.

11. The computing device of claim 10, wherein adjusting the respective scene classification threshold of a next lowest rank group of the wireless cameras to the respective value that decreases the likelihood of the respective scenes of the next lowest rank group of the wireless cameras being classified at the respective higher scene interest level includes controlling the next lowest rank group of the wireless cameras that generate the respective scenes according to a respective lower scene interest level to lower their respective network loading on the given sector.

12. The computing device of claim 10, wherein the set of operations further comprises, after adjusting the respective scene classification threshold of the lowest rank group of the wireless cameras:

when the network loading level continues to exceed the first threshold, iteratively adjusting the respective scene classification threshold of the lowest rank group of the wireless cameras to respective values that successively decrease the likelihood of the respective scenes of the lowest rank group of the wireless cameras being classified at a respective higher scene interest level, until the network loading level is below the first threshold or the respective scene classification threshold of all of the lowest rank group of the wireless cameras are at a given value.

13. The computing device of claim 10, wherein the set of operations further comprises:

when the network loading level is below a second threshold, lower than the first threshold, iteratively adjusting the respective scene classification threshold of next highest rank groups of the wireless cameras, beginning with a highest rank group of the wireless cameras, to a respective value that increases the likelihood of the respective scenes of the next highest rank groups of the wireless cameras being classified at a respective higher scene interest level, until the network loading level is above the second threshold.

14. The computing device of claim 10, wherein the set of operations further comprises:

when the network loading level is below a second threshold, lower than the first threshold, iteratively adjusting the respective scene classification threshold of a highest rank group of the wireless cameras to respective values that successively increase the likelihood of the respective scenes of the highest rank group of the wireless cameras being classified at a respective higher scene interest level, until the network loading level is above the second threshold.

15. The computing device of claim 10, wherein the set of operations further comprises:

determining ranks of the wireless cameras from a memory that stores respective identifiers of the wireless cameras in association with the ranks.

16. The computing device of claim 10, wherein the set of operations further comprises:

detecting the wireless cameras in communication with the given sector.

17. The computing device of claim 10, wherein the set of operations further comprises:

performing a network loading level determination and scene classification threshold adjustment for respective cameras on other sectors of the base station.

18. The computing device of claim 10, wherein the network loading level is determined from Physical-layer Resource Block (PRB) usage data determined from the base station.

19. A method comprising:

determining, via a computing device, a network loading level on a given sector of a base station, the base station in communication with wireless cameras categorized according to rank;

when the network loading level exceeds a first threshold, adjusting, via the computing device, a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector; and after adjusting the respective scene classification threshold of the lowest rank group of the wireless cameras:

when the network loading level continues to exceed the first threshold, iteratively adjusting the respective scene classification threshold of the lowest rank group of the wireless cameras to respective values that successively decrease the likelihood of the respective scenes of the lowest rank group of the wireless cameras being classified at a respective higher scene interest level, until the network loading level is below the first threshold or the respective scene classification threshold of all of the lowest rank group of the wireless cameras are at a given value.

20. A computing device comprising:

a controller; and a computer-readable storage medium having stored thereon program instructions that, when executed by the controller, cause the computing device to perform a set of operations comprising:

determining a network loading level on a given sector of a base station, the base station in communication with wireless cameras categorized according to rank;

when the network loading level exceeds a first threshold, adjusting a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector; and after adjusting the respective scene classification threshold of the lowest rank group of the wireless cameras:

when the network loading level continues to exceed the first threshold, iteratively adjusting the respective scene classification threshold of the lowest rank group of the wireless cameras to respective values that successively decrease the likelihood of the respective scenes of the lowest rank group of the wireless cameras being classified at a respective higher scene interest level, until the network loading level is below the first threshold or the respective scene classification threshold of all of the lowest rank group of the wireless cameras are at a given value.

21. A method comprising:

determining, via a computing device, a network loading level on a given sector of a base station, the base station in communication with wireless cameras categorized according to rank;

when the network loading level exceeds a first threshold, adjusting, via the computing device, a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector; and when the network loading level is below a second threshold, lower than the first threshold, iteratively adjusting the respective scene classification threshold of next highest rank groups of the wireless cameras, beginning with a highest rank group of the wireless cameras, to a respective value that increases the likelihood of the respective scenes of the next highest rank groups of the wireless cameras being classified at a respective higher scene interest level, until the network loading level is above the second threshold.

22. A computing device comprising:

a controller; and a computer-readable storage medium having stored thereon program instructions that, when executed by the controller, cause the computing device to perform a set of operations comprising:

determining a network loading level on a given sector of a base station, the base station in communication with wireless cameras categorized according to rank;

when the network loading level exceeds a first threshold, adjusting a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector; and when the network loading level is below a second threshold, lower than the first threshold, iteratively adjusting the respective scene classification threshold of next highest rank groups of the wireless cameras, beginning with a highest rank group of the wireless cameras, to a respective value that increases the likelihood of the respective scenes of the next highest rank groups of the wireless cameras being classified at a respective higher scene interest level, until the network loading level is above the second threshold.

23. A method comprising:

determining, via a computing device, a network loading level on a given sector of a base station, the base station in communication with wireless cameras categorized according to rank;

when the network loading level exceeds a first threshold, adjusting, via the computing device, a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector; and when the network loading level is below a second threshold, lower than the first threshold, iteratively adjusting the respective scene classification threshold of a highest rank group of the wireless cameras to respective values that successively increase the likelihood of the respective scenes of the highest rank group of the wireless cameras being classified at a respective higher scene interest level, until the network loading level is above the second threshold.

24. A computing device comprising:

a controller; and a computer-readable storage medium having stored thereon program instructions that, when executed by the controller, cause the computing device to perform a set of operations comprising:

determining a network loading level on a given sector of a base station, the base station in communication with wireless cameras categorized according to rank;

when the network loading level exceeds a first threshold, adjusting a respective scene classification threshold of a lowest rank group of the wireless cameras to a value that decreases a likelihood of scenes of the lowest rank group of the wireless cameras being classified at a higher scene interest level, wherein scenes classified according to the higher scene interest level are streamed by the wireless cameras at a quality higher than other scenes classified to a lower scene interest level, thereby controlling the wireless cameras of the lowest rank group, that generate respective scenes according to the lower scene interest level, to lower their respective network loading on the given sector; and when the network loading level is below a second threshold, lower than the first threshold, iteratively adjusting the respective scene classification threshold of a highest rank group of the wireless cameras to respective values that successively increase the likelihood of the respective scenes of the highest rank group of the wireless cameras being classified at a respective higher scene interest level, until the network loading level is above the second threshold.

* * * * *